US011338717B2

(12) United States Patent
Hodge et al.

(10) Patent No.: US 11,338,717 B2
(45) Date of Patent: May 24, 2022

(54) INTEGRATED VEHICLE VENDING MACHINE

(71) Applicant: 7-Eleven, Inc., Irving, TX (US)

(72) Inventors: Jonathan Christopher Hodge, Frisco, TX (US); Gurmeet Singh, Irving, TX (US); Maninder Singh Suri, Irving, TX (US); Ranganathan Mohan, Frisco, TX (US)

(73) Assignee: 7-ELEVEN, INC., Irving, TX (US)

( * ) Notice: Subject to any disclaimer, the term of this patent is extended or adjusted under 35 U.S.C. 154(b) by 168 days.

(21) Appl. No.: 16/413,287

(22) Filed: May 15, 2019

(65) Prior Publication Data

US 2020/0361356 A1 Nov. 19, 2020

(51) Int. Cl.
*B60N 3/10* (2006.01)
*B60R 7/04* (2006.01)
(Continued)

(52) U.S. Cl.
CPC ............ *B60N 3/103* (2013.01); *B60N 3/104* (2013.01); *B60P 3/0257* (2013.01); *B60R 7/04* (2013.01);
(Continued)

(58) Field of Classification Search
CPC ....... B60N 3/103; B60N 3/104; B60P 3/0257; B60R 7/04; B60R 2011/0007; B60R 7/06; G06Q 20/341
(Continued)

(56) References Cited

U.S. PATENT DOCUMENTS 3,368,718 A * 2/1968 Janicek, Jr. .......... B67D 1/0021
222/129.2
3,955,713 A * 5/1976 Hurley .................. A47J 31/401
222/129.4
(Continued)

FOREIGN PATENT DOCUMENTS

CN 105235600 A 1/2016
DE 202012011474 U1 1/2013
(Continued)

OTHER PUBLICATIONS

Hodge, J. C. et al., "Remote Vending Using an Integrated Vehicle Vending Machine," U.S. Appl. No. 16/413,359, filed May 15, 2019, 54 pages.

*Primary Examiner* — Christopher Garft
*Assistant Examiner* — Michael McDuffie
(74) *Attorney, Agent, or Firm* — Baker Botts, LLP

(57) ABSTRACT

A device that includes a housing configured to couple to a vehicle console. The device further includes a lid that is configurable between a closed position and an open position. The device further includes a lock is configured to transition from a locked configuration to an unlocked configuration. In the locked configuration, the lock is configured to maintain the lid in the closed position. In the unlocked configuration, the lock is configured to release the lid from the closed position. The device further includes a user interface configured to display products, receive a user input identifying a product, receive card information, send an authorization request that requests a purchase of the product, and send an authorization signal to a controller in response to receiving an approval message. The device further includes the controller configured to send an actuation signal to unlock the lock in response to receiving the authorization signal.

19 Claims, 12 Drawing Sheets

(51) Int. Cl.
*G06Q 20/34* (2012.01)
*B60P 3/025* (2006.01)
*B60R 11/00* (2006.01)

(52) U.S. Cl.
CPC .... *G06Q 20/341* (2013.01); *B60R 2011/0007* (2013.01)

(58) Field of Classification Search
USPC .............. 248/550, 551, 552, 27.1, 146, 147; 296/24.34, 37.12, 37.16; 224/483, 275; 297/188.01, 188.04, 188.07, 188.14, 297/188.18, 188.19, 188.2; D12/415–416
See application file for complete search history.

(56) References Cited

U.S. PATENT DOCUMENTS

| | | | |
|---|---|---|---|
| 3,987,945 A | 10/1976 | McDowell | |
| 4,146,159 A | 3/1979 | Hemmen | |
| 4,512,503 A * | 4/1985 | Gioso | B60R 7/043 206/216 |
| 4,688,701 A * | 8/1987 | Sedam | B01F 3/04787 222/129.1 |
| 5,397,160 A | 3/1995 | Landry | |
| 5,405,068 A | 4/1995 | Lovett | |
| 5,538,169 A | 7/1996 | Moore | |
| 5,542,589 A | 8/1996 | McKee | |
| 5,551,616 A * | 9/1996 | Stitt | B60R 7/043 224/275 |
| 5,842,188 A * | 11/1998 | Ramsey | G07F 13/025 705/416 |
| 5,951,128 A | 9/1999 | Aidone et al. | |
| 6,003,927 A | 12/1999 | Körber et al. | |
| 6,390,345 B1 | 5/2002 | Brown et al. | |
| 6,422,440 B1 * | 7/2002 | Stone | B60R 7/043 224/275 |
| 6,547,299 B2 | 4/2003 | Atanasiu et al. | |
| 6,652,024 B2 | 11/2003 | Prasatek | |
| 6,719,343 B2 | 4/2004 | Emerling et al. | |
| 6,759,636 B2 * | 7/2004 | Stutman | B60N 3/16 219/679 |
| 6,771,187 B2 * | 8/2004 | Falk | B64D 11/0015 340/971 |
| 6,827,384 B2 | 12/2004 | Anderson et al. | |
| 6,986,447 B2 | 1/2006 | Truong | |
| 7,240,814 B2 | 7/2007 | Holmberg | |
| 7,592,916 B2 | 9/2009 | Staples | |
| 7,878,567 B2 | 2/2011 | Schneider et al. | |
| 7,969,304 B2 | 6/2011 | Berland et al. | |
| 8,251,443 B1 | 8/2012 | Hahn et al. | |
| 8,319,630 B1 | 11/2012 | Salwan | |
| 8,413,812 B2 | 4/2013 | Pidgeon et al. | |
| 8,814,234 B2 | 8/2014 | Kokubo et al. | |
| 8,910,841 B2 * | 12/2014 | Genung | B60R 7/00 224/274 |
| 9,014,149 B2 | 4/2015 | Mochida | |
| 9,015,071 B2 | 4/2015 | Breed | |
| 9,098,959 B2 * | 8/2015 | Baric | G07F 9/10 |
| 9,227,571 B1 | 1/2016 | Wilkens | |
| 9,238,439 B2 | 1/2016 | Huebner et al. | |
| 9,428,115 B2 | 8/2016 | Seifert | |
| 9,669,740 B2 | 6/2017 | Hansen et al. | |
| 9,738,195 B2 | 8/2017 | Willis | |
| 9,897,287 B1 | 2/2018 | Cotton et al. | |
| 10,295,250 B2 | 5/2019 | Buttolo et al. | |
| 2002/0108981 A1 | 8/2002 | Smith | |
| 2004/0055927 A1 | 3/2004 | McNutt et al. | |
| 2004/0217615 A1 | 11/2004 | Lindstrom et al. | |
| 2004/0251285 A1 | 12/2004 | O'Neill | |
| 2005/0092793 A1 | 5/2005 | Berggren | |
| 2005/0196152 A1 | 9/2005 | Chen et al. | |
| 2006/0075759 A1 | 4/2006 | Krieger et al. | |
| 2006/0113342 A1 | 6/2006 | Hampton et al. | |
| 2008/0067205 A1 | 3/2008 | Semendoff | |
| 2011/0297714 A1 | 12/2011 | Freeman | |
| 2012/0125966 A1 | 5/2012 | Greenspon | |
| 2013/0206784 A1 | 8/2013 | Short et al. | |
| 2013/0248572 A1 | 9/2013 | Myers | |
| 2013/0297463 A1 * | 11/2013 | Garber | G06Q 10/087 705/28 |
| 2014/0132044 A1 | 5/2014 | Louie | |
| 2014/0209634 A1 * | 7/2014 | Metropulos | B67D 1/06 222/129.1 |
| 2014/0291372 A1 | 10/2014 | Smith | |
| 2014/0316561 A1 * | 10/2014 | Tkachenko | G07F 11/02 700/236 |
| 2015/0144653 A1 * | 5/2015 | Kline | B67D 1/0888 222/1 |
| 2015/0183378 A1 | 7/2015 | Tipler | |
| 2015/0307030 A1 | 10/2015 | Locascio | |
| 2016/0012465 A1 * | 1/2016 | Sharp | G06Q 20/386 705/14.17 |
| 2016/0239802 A1 | 8/2016 | Burch, V et al. | |
| 2016/0318452 A1 | 11/2016 | Donofrio et al. | |
| 2017/0158142 A1 | 6/2017 | Oldani | |
| 2018/0037169 A1 | 2/2018 | Dunham et al. | |
| 2018/0044075 A1 | 2/2018 | Asberry | |
| 2019/0023168 A1 | 1/2019 | Wheeler et al. | |
| 2019/0147687 A1 * | 5/2019 | Meduri | G07F 11/42 221/1 |
| 2019/0205961 A1 * | 7/2019 | Baren | G06Q 20/322 |
| 2019/0311417 A1 * | 10/2019 | Randisi | H04W 4/23 |
| 2020/0055423 A1 * | 2/2020 | Prozzi | B60N 2/062 |
| 2020/0154949 A1 * | 5/2020 | Klein | B60P 3/0257 |
| 2020/0160324 A1 * | 5/2020 | Mars | G06Q 20/40145 |
| 2020/0364688 A1 * | 11/2020 | Hodge | G01C 21/3679 |

FOREIGN PATENT DOCUMENTS

| | | |
|---|---|---|
| EP | 0885769 A2 | 12/1998 |
| EP | 1108614 A1 | 6/2001 |
| FR | 2844433 A1 | 3/2004 |
| FR | 2878798 A1 | 6/2006 |
| GB | 1471034 A | 4/1977 |
| GB | 2285781 A | 7/1995 |
| KR | 200378096 Y1 | 3/2005 |
| KR | 20150000963 A | 1/2015 |
| WO | 2013034519 A1 | 3/2013 |
| WO | 201099311 A1 | 7/2015 |

* cited by examiner

INTEGRATED VEHICLE VENDING MACHINE

TECHNICAL FIELD

The present disclosure relates generally to a vending machine, and more specifically to a vending machine that is integrated with a vehicle.

BACKGROUND

Ridesharing services allow passengers to hire a driver for transportation to some destination. For these services, the driver may use their personal vehicles or a company vehicle to transport their passengers. The vehicles that are used are only equipped for transportation and are ill-equipped for providing other products and/or services while on the road. For example, a passenger may want to purchase food or drinks while being transported to their final destination. Typically, these types of items are unavailable in the vehicle which means that the passenger will have to wait until they reach the final destination to find a location to purchase these items. These vehicles are not network-enabled (e.g. connected to the Internet) and lack the capability to request and receive information that enables other services and products to be offered to their passengers. This inability to access information limits the overall functionality of the vehicles that are used by ridesharing services. Thus, it is desirable to provide the ability to access information from remote data sources to increase the functionality of the vehicles used in rideshare services.

SUMMARY

Ridesharing services allow passengers to hire a driver for transportation to some destination. For these services, the driver may use their personal vehicles or a company vehicle to transport their passengers. The vehicles that are used are only equipped for transportation and are ill-equipped for providing other products and/or services while on the road. For example, a passenger may want to purchase food or drinks while being transported to their final destination. Typically, these types of items are unavailable in the vehicle which means that the passenger will have to wait until they reach their final destination to find a location to purchase these items. These vehicles are not network-enabled (e.g. connected to the Internet) and lack the capability to request and receive information that enables other services and products to be offered to their passengers. This inability to access information limits the overall functionality of the vehicles that are used by ridesharing services. Thus, it is desirable to provide the ability to access information from remote data sources to increase the functionality of the vehicles used in rideshare services.

The system described in the present application provides a technical solution to the technical problems discussed above by employing an architecture that enables and utilizes network connectivity for a vending machine that is located in a vehicle. The disclosed system provides several practical applications and technical advantages which include 1) converting vehicles into network-enabled vehicles which allows products and services to be offered to its passengers and 2) providing the ability to modify ridesharing routes to include detours to a location where products can be purchased before reaching a final destination.

In one embodiment, a vending machine that is installed in a vehicle is configured to allow passengers in a rear passenger seat to make transactions with the vending machine and to retrieve their purchased products without distracting the driver. The vending machine comprises a housing with a lid. The housing is configured to be installed or mounted onto an interior of the vehicle such as a center console. The housing comprises an interior storage portion that is configured to hold one or more consumer products. The lid is coupled to the housing and is configurable between a closed position and an open position. The lid is configured to restrict access to products in the interior storage portion of the housing when the lid is in the closed position. The lid is configured to allow access to products in the interior storage portion of the housing when the lid is in the open position.

The vending machine further comprises an electromechanical lock coupled to the housing. The electromechanical lock is configured to transition from a locked configuration to an unlocked configuration in response to an actuation signal from a controller. The electromechanical lock is configured to maintain the lid in the closed position when the electromechanical lock is in the locked configuration and to release the lid from the closed position when the electromechanical lock is in the unlocked configuration.

The vending machine further comprises a card reader, a user interface, and a controller. The card reader is configured to receive payment card information for a payment card. The user interface is configured to display one or more products that are available for purchase, to receive a user input identifying a product for purchase, and to receive payment card information from the card reader. The user interface is further configured to send an authorization request to a remote server that requests a purchase of the product using the payment card information and to send an authorization signal to the controller in response to receiving the approval message from the remote server. The controller is coupled to the housing and is configured to receive the authorization signal and to send the actuation signal to the electromechanical lock to unlock the vending machine so that the passenger can retrieve their purchased products.

In one embodiment, the vending machine is configured to facilitate a purchase of a product from the vending machine that is installed in a vehicle. The vending machine may be configured to display one or more products available for purchase, to receive a user input identifying a product for purchase, and to receive payment card information for a payment card. In other words, the vending machine displays products that a passenger can purchase from the vending machine and the passenger can purchase one of the products by identifying the product and providing their payment card information.

The vending machine sends an authorization request to a remote server that requests a purchase of the product using the payment card information and sends an authorization signal to a controller in response to receiving the approval message from the remote server. Here, the vending machine communicates with a remote server (e.g. a payment processor) to make a purchase of the products the passenger requested.

Once the transaction has been approved to purchase the products, the vending machine will transition to a configuration that allows the passenger to retrieve their products. The vending machine sends an actuation signal to a lock installed on the vending machine which triggers the lock to transition from a locked configuration to an unlocked configuration. The lock is configured to maintain a lid of the vending machine in a closed position when the lock is in the locked configuration. The lid is configured to restrict access to an interior storage portion of the vending machine where products are held when the lid is in the closed position. The lock is configured to release the lid of the vending machine from the closed position when the lock is in the unlocked configuration.

In one embodiment, the vending machine is configured to facilitate a remote purchase of a product from a store using the vending machine that is installed in a vehicle. The vending machine is configured to receive a user input identifying a product and to determine that the products are not currently available in the vending machine. The vending machine is further configured to determine a current location of the vending machine, to determine a vending location where the product is available, and to modify a route to a final destination to include the vending location. Here, modifying the route comprises rerouting the route to stop at the vending location before reaching the final destination. The vending machine is further configured to receive payment card information for a payment card and to send an authorization request to a remote server that requests a purchase of the product using the payment card information. The vending machine is further configured to receive an approval message that authorizes the purchase of the product, to generate an authorization token that authorizes the passenger to retrieve the products from the store at the vending location, and to output the authorization token to the passenger.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
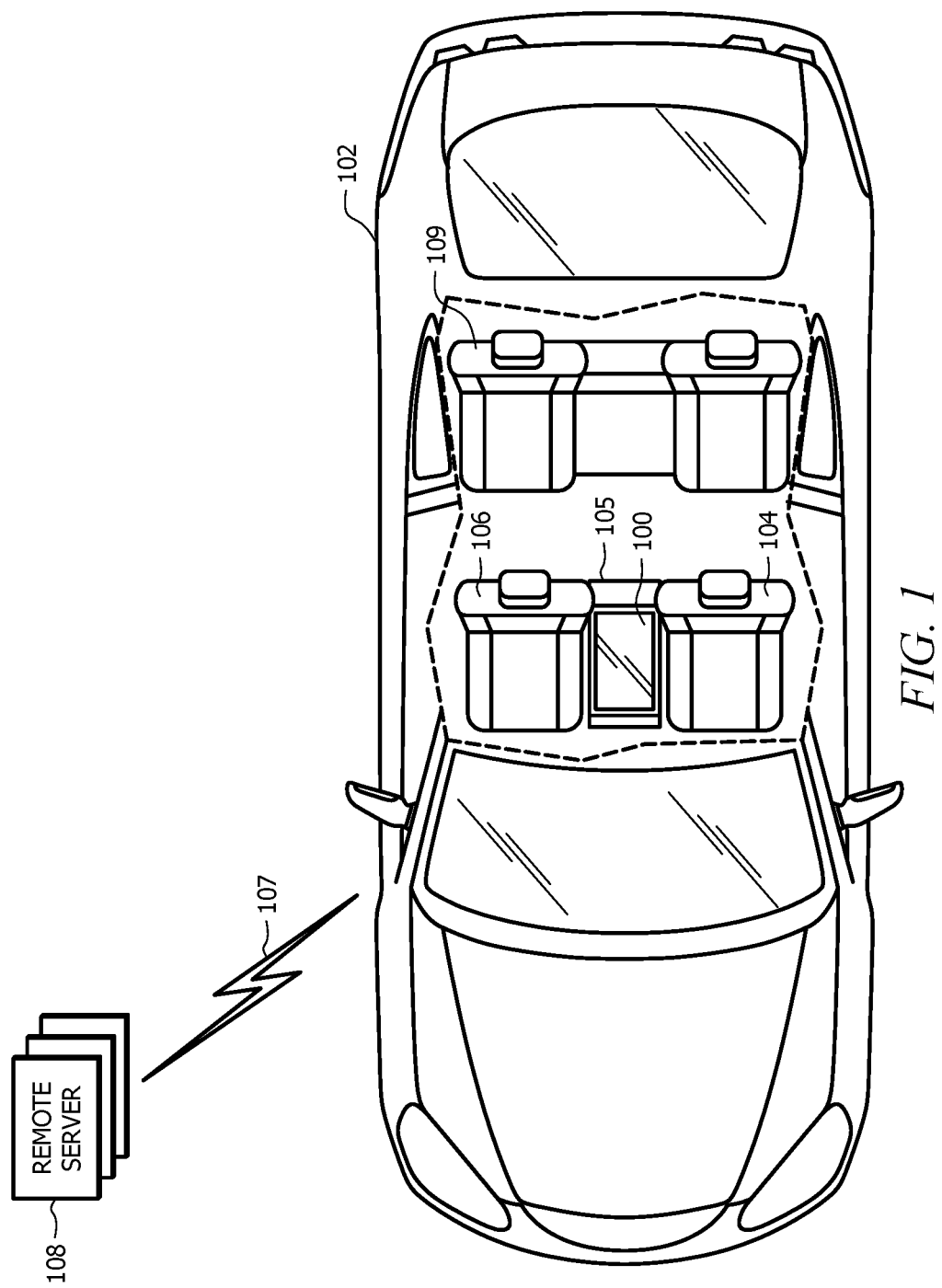
FIG. 1 is a schematic diagram of an embodiment of a vending machine integrated with a vehicle.

Ridesharing services allow passengers to hire a driver for transportation to some destination. For these services, the driver may use their personal vehicles or a company vehicle to transport their passengers. The vehicles that are used are only equipped for transportation and are ill-equipped for providing other products and/or services while on the road. For example, these vehicles are not network-enabled (e.g. connected to the Internet) and lack the capability to request and receive information that enables other services and products to be offered to their passengers. This inability to access information limits the overall functionality of the vehicles that are used by ridesharing services. Thus, it is desirable to provide the ability to access information from remote data sources to increase the functionality of the vehicles used in rideshare services.

The system described in the present application provides a technical solution to the technical problems discussed above by employing an architecture that enables and utilizes network connectivity for a vending machine that is located in a vehicle. The disclosed system provides several practical applications and technical advantages which include 1) converting vehicles into network-enabled vehicles which allows products and services to be offered to its passengers and 2) providing the ability to modify ridesharing routes to include detours to a location where products can be purchased before reaching a final destination.

In one embodiment, a vending machine that is installed in a vehicle is configured to allow passengers in a rear passenger seat to make transactions with the vending machine and to retrieve their purchased products without distracting the driver. The vending machine may be configured to display one or more products available for purchase, to receive a user input identifying a product for purchase, and to receive payment card information for a payment card. In other words, the vending machine displays products that a passenger can purchase from the vending machine and the passenger can purchase one of the products by identifying the product and providing their payment card information.

The vending machine sends an authorization request to a remote server that requests a purchase of the product using the payment card information and sends an authorization signal to a controller in response to receiving the approval message from the remote server. Here, the vending machine communicates with a remote server (e.g. a payment processor) to make a purchase of the products the passenger requested.

Once the transaction has been approved to purchase the products, the vending machine will transition to a configuration that allows the passenger to retrieve their products. The vending machine sends an actuation signal to a lock installed on the vending machine which triggers the lock to transition from a locked configuration to an unlocked configuration. The lock is configured to maintain a lid of the vending machine in a closed position when the lock is in the locked configuration. The lid is configured to restrict access to an interior storage portion of the vending machine where products are held when the lid is in the closed position. The lock is configured to release the lid of the vending machine from the closed position when the lock is in the unlocked configuration.

In one embodiment, the vending machine is configured to facilitate a remote purchase of a product from a store using the vending machine that is installed in a vehicle. The vending machine is configured to receive a user input identifying a product and to determine that the products is not currently available in the vending machine. The vending machine determines a current location of the vending machine, determines a vending location where the product is available, and modifies a route to a final destination to include the vending location. Here, modifying the route comprises rerouting the route to stop at the vending location before reaching the final destination. The vending machine receives payment card information for a payment card and sends an authorization request to a remote server (e.g. a payment processor) that requests a purchase of the product using the payment card information. The vending machine receives an approval message that authorizes the purchase of the product, generates an authorization token that authorizes the passenger to retrieve the products from the store at the vending location, and outputs the authorization token to the passenger.

Vending Machine Overview

FIG. 1 is a schematic diagram of an embodiment of a vending machine 100 integrated with a vehicle 102. Examples of vehicles 102 include, but are not limited to, cars, trucks, vans, sports utility vehicles (SUVs), buses, or any other suitable type of vehicle. In one embodiment, the vending machine 100 is coupled to a center console 105 of the vehicle 102 between a driver's seat 104 and a passenger's seat 106 of the vehicle 102. In other examples, the vending machine 100 may be in any other suitable location within the vehicle 102. The vending machine 100 is configured to allow passengers in a rear passenger seat 109 to make transactions with the vending machine 100 and to retrieve purchased products without distracting the driver. Additional information about the vending machine 100 is described in FIGS. 2-9. Examples of ways to couple the vending machine 100 to a center console 105 are described in FIGS. 6 and 7. Examples of the vending machine 100 in operation are described in FIGS. 10-12.

Remote Server

The remote server 108 may be formed by one or more physical devices configured to provide services and resources (e.g. data and/or hardware resources) for the vending machine 100. For example, the remote server 108 may be a proxy server that acts as an intermediary for exchanging data between vending machine 100 and a payment processor (e.g. a credit card payment processor). A remote server 108 may be a server associated with a vendor, a rideshare application or service, a payment processor, or any other entity. Example of remote servers 108 in operation are described in FIGS. 10-12.

The vending machine 100 is in signal communication with one or more remote servers 108 using a network connection 107. The network may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network may be configured to support any suitable type of communication protocol as would be appreciated by one of ordinary skill in the art upon viewing this disclosure.

Vending Machine Structure

Figure 2:
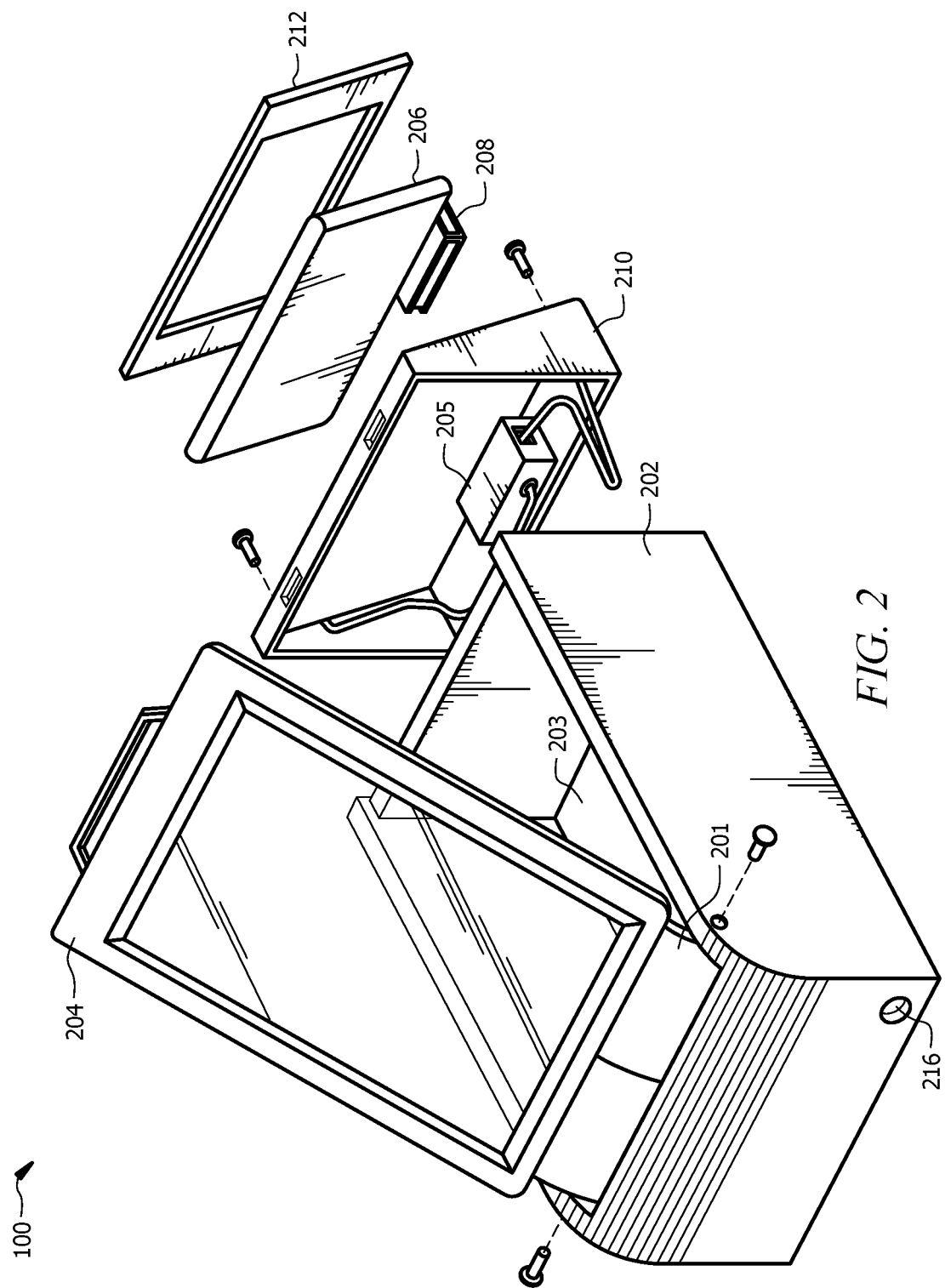
FIG. 2 is an exploded view of an embodiment of the vending machine from a first perspective.
Figure 3:
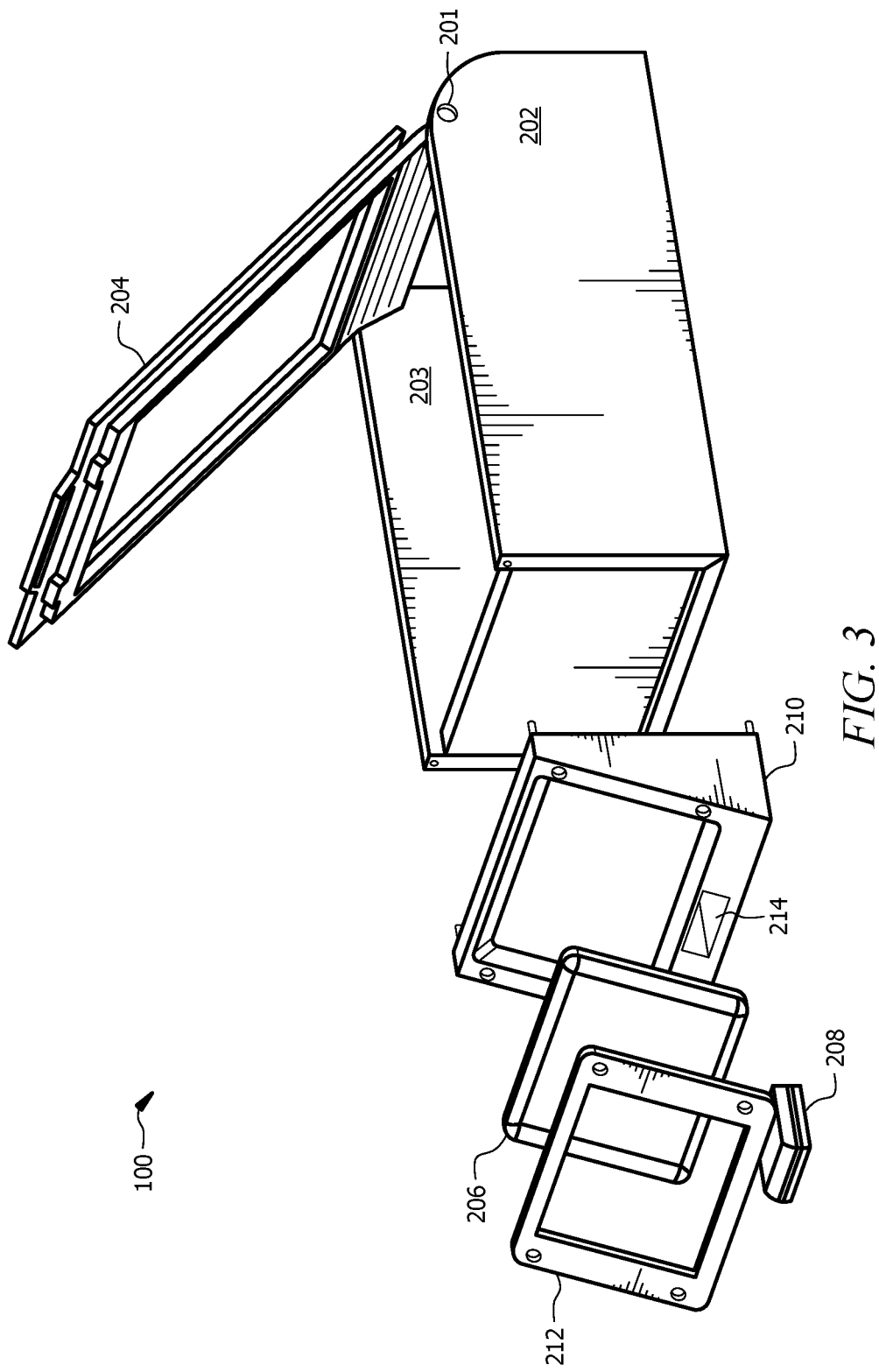
FIG. 3 is another exploded view of an embodiment of the vending machine from a second perspective.

FIGS. 2 and 3 are exploded views of an embodiment of the vending machine 100 from a first perspective (e.g. a driver's perspective) and a second perspective (e.g. a rear passenger's perspective), respectively. In one embodiment, the vending machine 100 comprises a housing 202, a lid 204, a user interface 206, a card reader 208, and a controller 205.

The housing 202 is configured to couple to an interior portion (e.g. a center console 105) of a vehicle 102. The housing 202 comprises an interior storage portion 203 that is configured to hold consumer products. For example, the interior storage portion 203 may be configured to hold drinks, food, or any other type of products. The housing 202 may be formed of plastic, aluminum, fiberglass, or any other type suitable materials. The housing 202 may comprise one or more holes or openings 216 for allowing access to the interior of the housing 202. For example, the housing 202 may comprise a hole 216 that allows a power cable to pass through the interior of the housing 202 to provide power to components of the vending machine 100 (e.g. the user interface 206, the card reader 208, and the controller 205). In some examples, the power cable may also be configured to provide power to other external devices such as a passenger's phone or tablet.

In FIG. 2, the lid 204 is coupled to an upper portion of the housing 202 using a hinged connection 201. In other embodiments, the lid 204 may be coupled to the housing 202 using any other suitable technique as would be appreciated by one of ordinary skill in the art. The lid 204 is configurable between a closed position and an open position with respect to the housing 202. The lid 204 is configured to restrict access to items held in the interior storage portion 203 of the housing 202 when the lid 204 is in the closed position. The lid 204 is configured to allow access to items held in the interior storage portion 203 of the housing 202 when the lid 204 is in the open position. In FIG. 2, the lid 204 is shown in the open position.

In one embodiment, the lid 204 may be configured such that at least a portion of the lid 204 is transparent. For example, the lid 204 may comprise one or more windows covered by glass or transparent plastic that provides visibility to the items in the interior storage portion 203 of the housing 202. In FIG. 2, the vending machine 100 comprises a single lid 204, however, in other examples, the vending machine 100 may comprise multiple lids 204. For example, the vending machine 100 may be configured with two or more lids 204 that each allow access to only a portion of the items stored within the interior storage portion 203 of the housing 202.

In FIG. 2, the vending machine 100 comprises a hardware housing 210 that is configured to couple one or more hardware components to the housing 202. The hardware housing 210 may be coupled to the housing 202 using screws, tabs, clips, or any other suitable attachment technique as would be appreciated by one of ordinary skill in the art. In other examples, hardware components of the vending machine 100 may be located within the structure of the housing 202.

Card Reader

The card reader 208 is configured to couple to the housing 202 and to receive payment card information from a passenger. In FIG. 2, the card reader 208 is configured to be disposed in a slot or opening 214 in the hardware housing 210. The card reader 208 may be configured to obtain payment card information by reading a magnetic strip when a passenger swipes their payment card. As another example, the card reader 208 may be configured to obtain payment card information by communicating with a smart chip on a payment card. As another example, the card reader 208 may be configured to obtain payment card information using near field communication when a payment card is placed on or near the card reader 208. In other examples, the card reader 208 may be configured to obtain payment card information using any other suitable technique as would be appreciated by one of ordinary skill in the art. Examples of payment cards include, but are not limited to, debit cards, credit cards, gift cards, loyalty cards, or any other suitable types of payment cards. The payment card information may comprise a card holder name, a card number (e.g. a primary account number (PAN)), a security code, an expiration date, a zip code, or any other information associated with the payment card.

User Interface

Examples of the user interface 206 include, but are not limited to, a tablet and a smart phone. The user interface 206 is configured to couple to the housing 202. In FIG. 2, the user interface 206 is configured to be mounted into an opening on the hardware housing 210. In this example, the user interface 206 is secured to the hardware housing 210 using a face plate 212. The user interface 206 is in signal communication with the card reader 208 and the controller 205. The user interface 206 may be coupled to the card reader 208 and the controller 205 using any suitable type of wired or wireless connection as would be appreciated by one of ordinary skill in the art. For example, the user interface 206 may be coupled to the card reader 208 and/or the controller 205 using any suitable type of wireless connection such as a Bluetooth, a Zigbee, or a near-field communication (NFC) connection. As another example, the user interface 206 may be coupled to the card reader 208 and/or the controller 205 using any suitable wired connection such as an audio cable or USB cable.

The user interface 206 is configured to display information to passengers. For example, the user interface 206 may be configured to display product information about products that are available for purchase within vending machine 100. In some examples, the user interface 206 may also display information about products that are available for purchase outside of the vending machine 100, for example products in a store that is associated with the vending machine 100. The user interface 206 may also be configured to display other information such as advertisements, ride share information, a map, weather information, news information, and traffic information.

The user interface 206 is configured to receive a user input from a passenger that identifies a product. For example, the user interface 206 may receive a user input that identifies a product that a user would like to purchase from the vending machine 100. The user interface 206 is further configured to receive payment card information from the card reader 208 and to communicate with the remote server 108 to process a purchase of the identified product using the payment card information. Once the user interface 206 receives an approval for the purchase of the product, the user interface 206 sends an authorization signal to the controller 205 to unlock the lid 204 so that the passenger can retrieve their product from the interior storage portion 203 of the housing 202. Additional information about the user interface 206 in operation is described in FIGS. 10-12.

Controller

In FIG. 2, the controller 205 is configured to be mounted to an interior portion of the hardware housing 210. The controller 205 is a hardware processor configured to control the operation of components of the vending machine 100. For example, the controller 205 may be in signal communication with a lock 514, lights 812, a camera 512, a weight sensor 510, a power supply 816, any other type of device, or combination thereof. Additional information about the controller 205 and its configuration is described in FIG. 8.

The controller 205 is configured to send actuation signals for locking and unlocking a lock 514 for the lid 204. By actuating the lock 514, the controller 205 controls a passenger's ability to access the items in the vending machine 100. The controller 205 may also be configured to provide security by monitoring the contents of the interior storage portion 203 of the housing 202 using a camera 512 and/or weight sensor 510. Here, the controller 205 is able to detect when a passenger takes additional products from the vending machine 100 that the passenger has not purchased. For example, controller 205 may detect when a passenger takes two drinks from the vending machine 100 when they only purchased one drink. Additional information for these examples of the controller 205 in operation is described in FIGS. 10-12.

Figure 4:
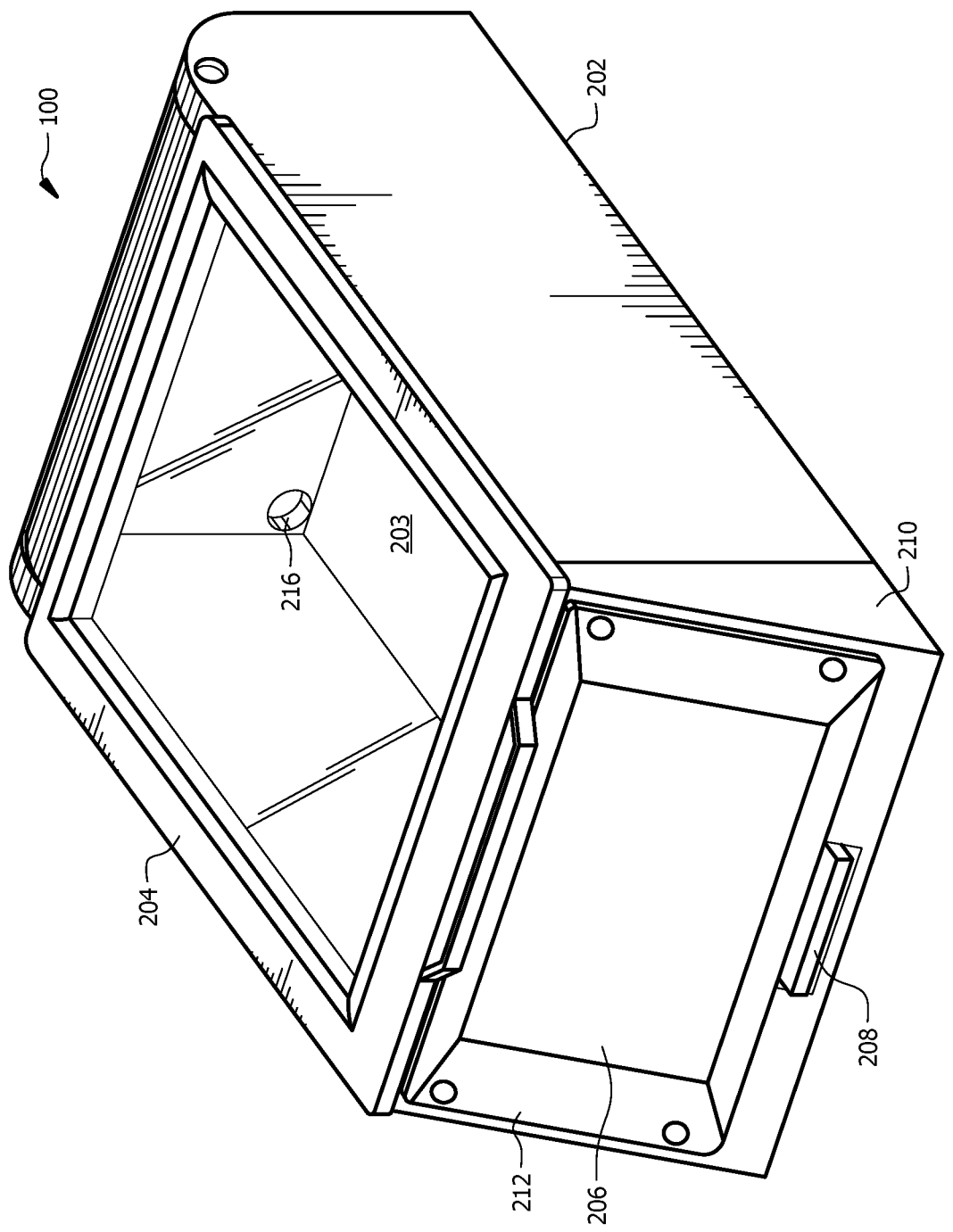
FIG. 4 is a perspective view of an embodiment of the vending machine.

FIG. 4 is a perspective view of an embodiment of the vending machine 100. In FIG. 4, the vending machine 100 is shown with the lid 204 configured in the closed position. In this configuration, the vending machine 100 restricts a passenger's ability to access to the items in the vending machine 100. In this example, the lid 204 has a transparent window that allows passengers to see the items that are available for purchase in the vending machine 100.

Figure 5:
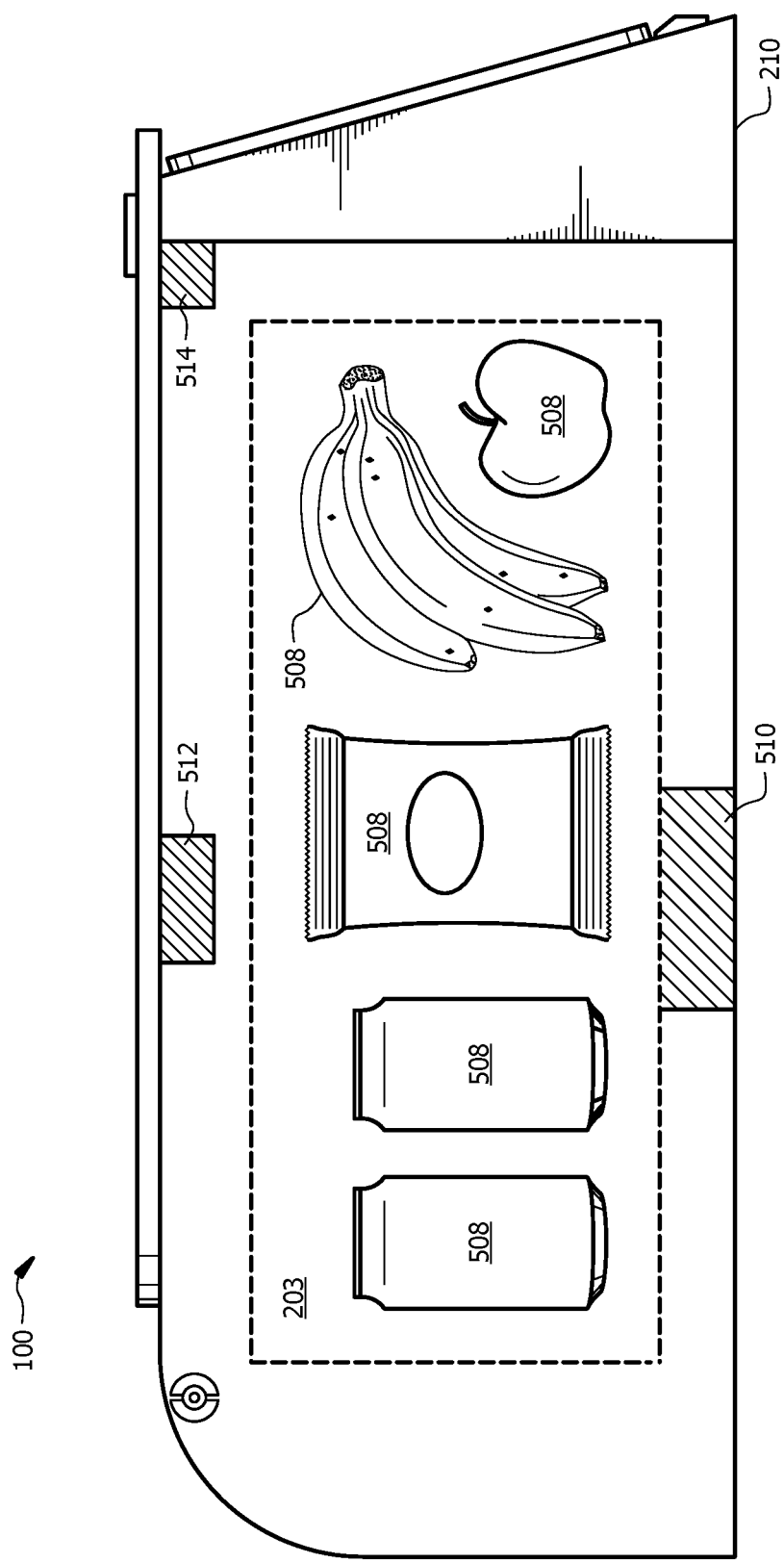
FIG. 5 is a partial cutaway side view of an embodiment of the vending machine.

FIG. 5 is a partial cutaway side view of an embodiment of the vending machine 100. In FIG. 5, the interior storage portion 203 is configured as a removable tray or compartment. This configuration allows the interior storage portion 203 of the housing 202 to be replaced or refilled with products 508 without having to completely remove the vending machine 100 from the vehicle 102. For example, a driver may open the lid 204 and remove the interior storage portion 203 from the housing 202 so that it can be cleaned and/or refilled at a store associated with the vending machine 100.

The vending machine 100 further comprises one or more weight sensors 510, one or more cameras 512, and a lock 514. The weight sensors 510, the cameras 512, and the lock 514 are each in signal communication with the controller 205 using any suitable type of wired or wireless connection. Examples of a weight sensor 510, a camera 512, and a lock 514 in operation are described in FIG. 10. Although FIG. 5 illustrates a single weight sensor 510, camera 512, and lock 514, the vending machine 100 may comprise any suitable number of weight sensors 510, cameras 512, and locking mechanisms 514.

Weight Sensor

Examples of a weight sensor 510 includes, but are not limited to, a piezoelectric load cell or a pressure sensor. The weight sensor 510 is disposed within the interior of the housing 202. For example, the weight sensor 510 may be positioned below or integrated with the bottom of the interior storage portion 203 of the housing 202. The weight sensor 510 is configured to measure the weight of objects (e.g. products 508) in the interior storage portion 203 of the housing 202. In one embodiment, the vending machine 100 may be configured with a weight sensor 510 for each product 508 in the vending machine 100. In this configuration, the vending machine 100 can detect which products 508 have been removed individually based on weight differences.

Camera

Examples of the camera 512 include, but are not limited to, a webcam, printed circuit board (PCB) camera module, and a depth sensing camera. The camera 512 is disposed within the interior of the housing 202. For example, the camera 512 may be positioned above or adjacent to the interior storage portion 203 of the housing 202. The camera 512 is configured to capture images of objects (e.g. products 508) in the interior storage portion 203 of the housing 202.

Locking Mechanism

An example of the lock 514 includes, but is not limited to, an electromechanical lock. The lock 514 is coupled to the housing 202 and positioned to engage at least a portion of the lid 204. The lock 514 is configurable between a locked configuration and an unlocked configuration. The lock 514 is configured to secure or maintain the lid 204 in the closed position when the lock 514 is in the locked configuration. The lock 514 is configured to release the lid 204 from the closed position when the lock 514 is in the unlocked configuration. In other words, the lock 514 allows the lid 204 to transition from the closed position to the open position when the lock 514 is in the unlocked configuration.

The lock 514 is configured to transition between the locked configuration and the unlocked configuration in response to an actuation signal from the controller 205. For example, the controller 205 may send a first actuation signal to the lock 514 to transition the lock 514 into the locked configuration to restrict access to the products 508 in the interior storage portion 203 of the housing 202. The controller 205 may send a second actuation signal to the lock 514 to transition the lock 514 from the locked configuration to the unlocked configuration.

Vending Machine Installation

Figure 6:
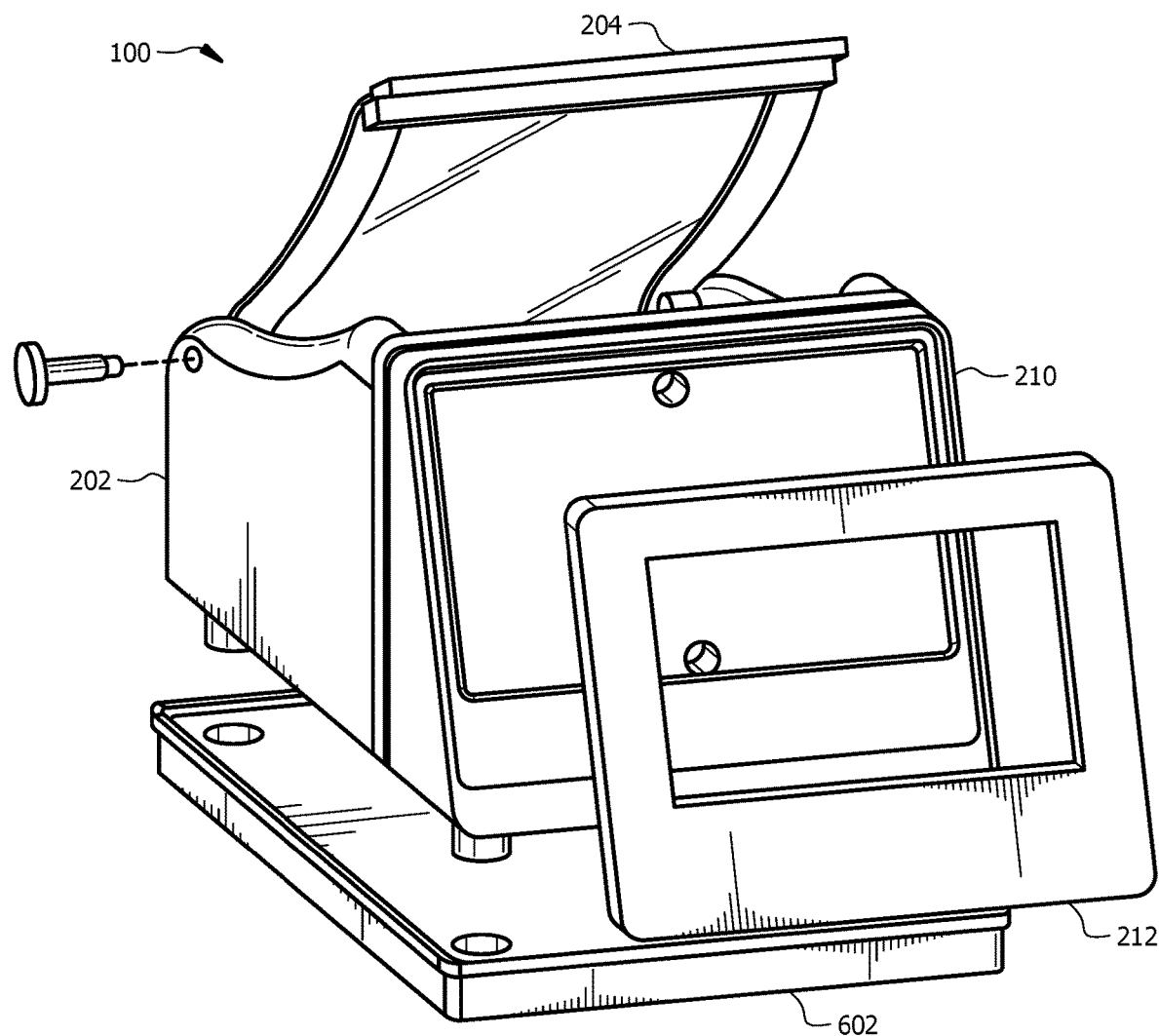
FIG. 6 is an exploded view of another embodiment of the vending machine.

FIG. 6 is an exploded view of another embodiment of the vending machine 100. In FIG. 6, the vending machine 100 comprises a mounting plate 602 that is configured to couple the housing 202 of vending machine 100 to an interior portion (e.g. a center console 105) of a vehicle 102. The mounting plate 602 may be removably coupled to vehicle 102 and the housing 202 using screws, tabs, clips, straps, or any other suitable attachment technique as would be appreciated by one of ordinary skill in the art. For example, the mounting plate 602 may be configured to attach to the center console 105 of a vehicle 102 using one or more straps. An example of this configuration is described in FIG. 7.

The mounting plate 602 may be configured to attach to the housing 202 using one or more screws, clips, or tabs. In this configuration, once the vending machine 100 is installed, the mounting plate 602 allows the housing 202 of the vending machine 100 to be quickly installed and/or removed from a vehicle 102. For example, the housing 202 may be periodically removed for cleaning, servicing, or refilling with products.

Figure 7:
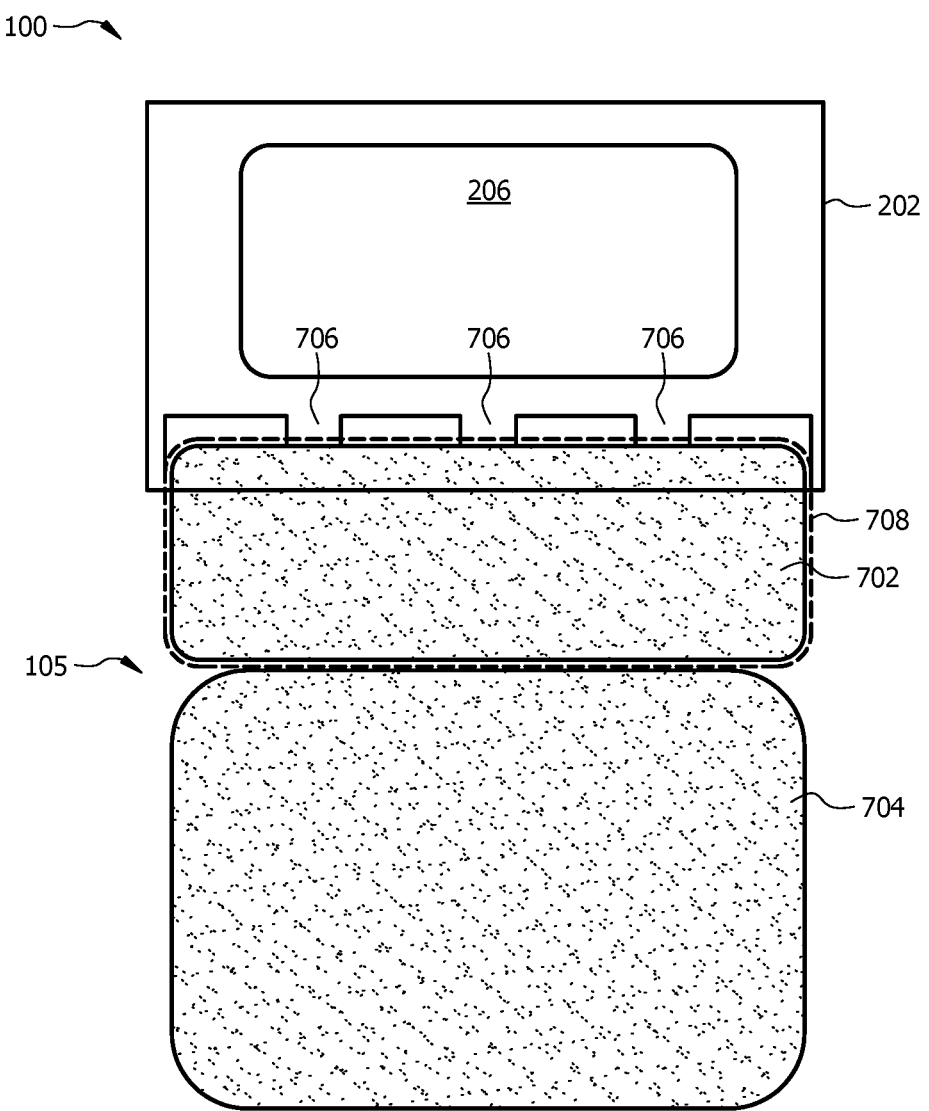
FIG. 7 is a front view of an embodiment of the vending machine attached to a center console of a vehicle.

FIG. 7 is a front view of an embodiment of the vending machine 100 attached to a center console 105 of a vehicle 102. In the example, the center console 105 comprises an upper portion 702 (e.g. a lid portion) and a lower portion 704 (e.g. a base or storage portion). The vending machine 100 is configured to sit on top of the upper portion 702 of the center console 105. In one embodiment, the vending machine 100 is configured such that a portion of the housing 202 hangs over the edges of the upper portion 702 of the center console 105. In FIG. 7, the housing 202 is configured to be attached to the upper portion 702 of the center console 105 using a strap 708. An example of strap 708 includes, but is not limited to, an elastic or semi-elastic strap that connects to itself using Velcro. In this example, the housing 202 comprises one or more belt loops or slots 706 on the underside of the housing 202. The belt loops 706 are configured to allow the strap 708 to pass through the underside of the housing 202 which allows the housing 202 to be attached to the upper portion 702 of the center console 105. This configuration allows the vending machine 100 to be quickly installed and removed from a vehicle 102 by disconnecting the strap 708.

Hardware Configuration

Figure 8:
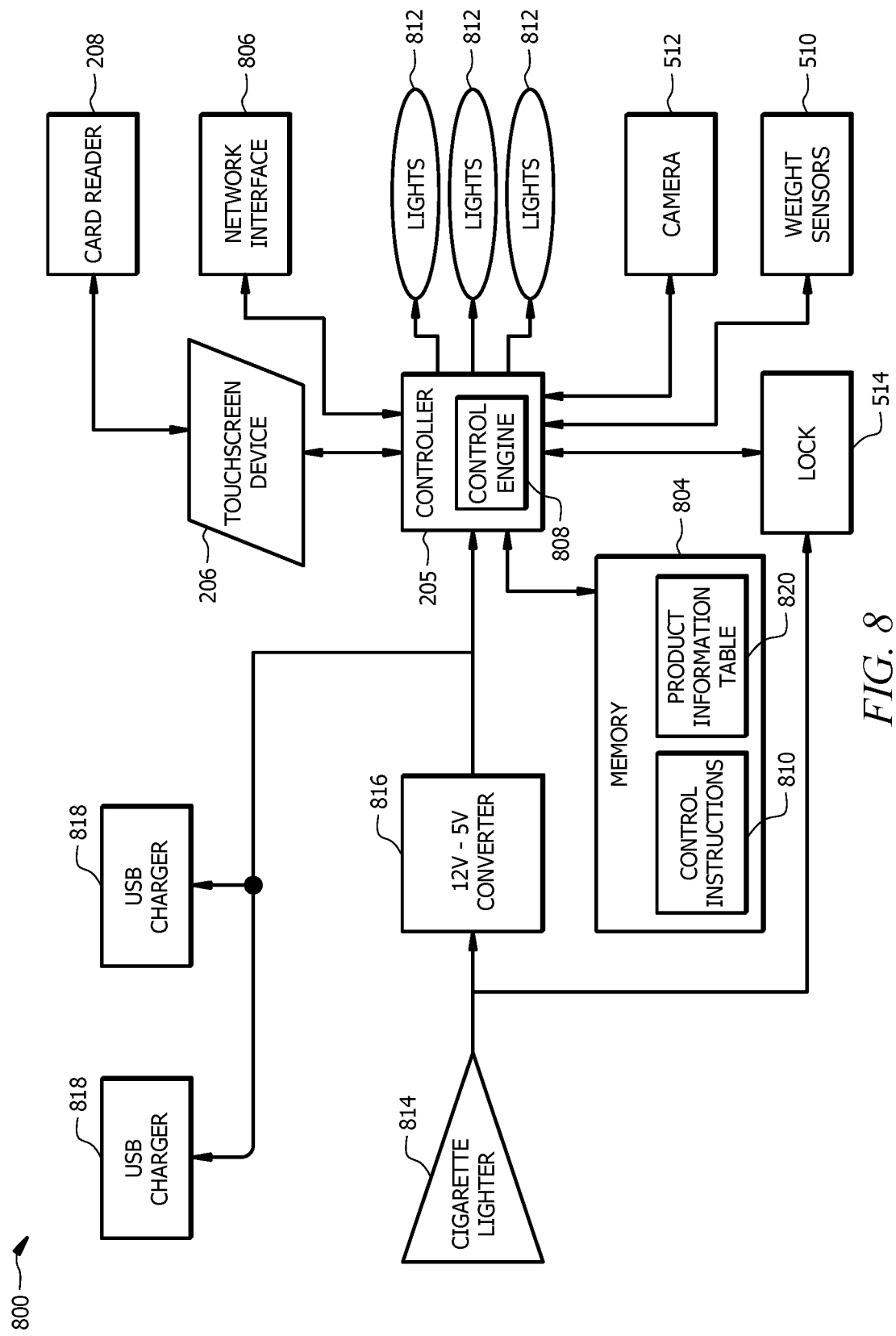
FIG. 8 is a schematic diagram of an embodiment of a hardware configuration for the vending machine.

FIG. 8 is a schematic diagram of an embodiment of a hardware configuration 800 for the vending machine 100. The vending machine 100 may be configured as shown or in any other suitable configuration as would be appreciated by one of ordinary skill in the art. For example, the vending machine 100 may comprise one or more additional components and/or may omit one or more components.

The vending machine 100 comprises the controller 205 in signal communication with one or more of a memory 804, a network interface 806, one or more lights 812, a user interface 206, a lock 514, a weight sensor 510, a camera 512, and a power supply 816.

The controller 205 comprises one or more processors operably coupled to the memory 804. The controller 205 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The controller 205 may be a programmable logic device, a microcontroller, a microprocessor, or any suitable combination of the preceding. The controller 205 is communicatively coupled to and in signal communication with the memory 804. The one or more processors are configured to process data and may be implemented in hardware or software. For example, the controller 205 may be 8-bit, 16-bit, 32-bit, 64-bit or of any other suitable architecture. The controller 205 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the control engine 808. In this way, controller 205 may be a special purpose computer designed to implement the functions disclosed herein. In one embodiment, the control engine 808 is implemented using logic units, FPGAs, ASICs, DSPs, or any other suitable hardware. The control engine 808 is configured to perform the operations for the controller 205 described in FIGS. 10-12.

The memory 804 comprises one or more disks, tape drives, or solid-state drives, and may be used as an over-flow data storage device, to store programs when such programs are selected for execution, and to store instructions and data that are read during program execution. The memory 804 may be volatile or non-volatile and may comprise read-only memory (ROM), random-access memory (RAM), ternary content-addressable memory (TCAM), dynamic random-access memory (DRAM), and static random-access memory (SRAM).

The memory 804 is operable to store control instructions 810, a product information table 820, and/or any other data or instructions. The control instructions 810 may comprise any suitable set of instructions, logic, rules, or code operable to execute the control engine 808.

The product information table 820 is configured to provide information about the products available in the vending machine 100. For example, the product information table 820 may comprise a plurality of entries that link product information, product identifiers, product weights, and a quantity of a product that is available within the vending machine 100. The product information table 820 may be implemented as table or in any other suitable data structure.

The network interface 806 is configured to enable wired and/or wireless communications. The network interface 806 is configured to communicate data between the user interface 206, the remote server 108, and/or other devices, systems, or domain. For example, the network interface 806 may comprise a WIFI interface, a LAN interface, a WAN interface, a modem, a switch, or a router. The controller 205 is configured to send and receive data using the network interface 806. The network interface 806 may be configured to use any suitable type of communication protocol as would be appreciated by one of ordinary skill in the art.

The one or more lights 812 may be configured to illuminate one or more portions of the vending machine 100. For example, the one or more lights 812 may be disposed within the housing 202 and configured to illuminate the interior storage portion 203 of the housing 202. The lights 812 may comprise light emitting diodes (LEDs), electroluminescence lights, incandescent bulbs, halogen bulbs, or any other suitable type of light.

Figure 9:
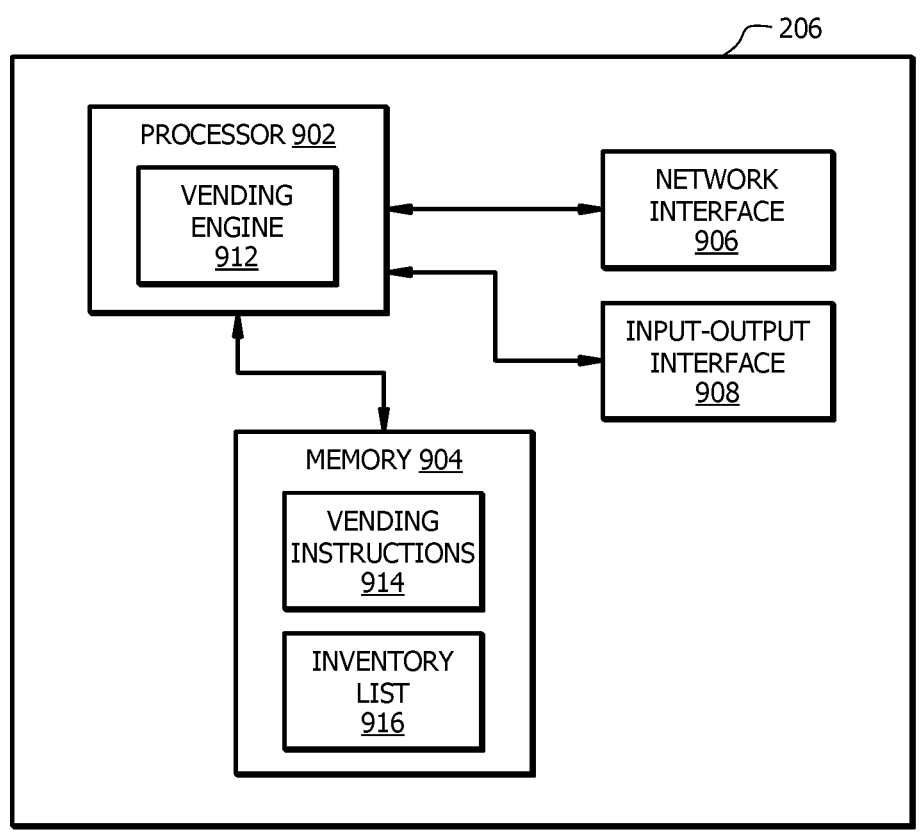
FIG. 9 is a schematic diagram of an embodiment of a user interface for a vending machine.

The user interface 206 may be configured similar to the user interface 206 described in FIGS. 1 and 9. The lock 514, the weight sensor 510, and the camera 512, may be configured similar to the lock 514, the weight sensor 510, and the camera 512 described in FIG. 5.

The power supply 816 is configured to provide electrical power to the controller 205 and other devices. In FIG. 8, the power supply 816 is configured to provide power to the controller 205, the lock 514, and one or more USB chargers 818. The USB chargers 818 may be charging ports for charging other devices such as a passenger's phone or tablet. In one embodiment, the power supply 816 comprises a 12-volt to 5-volt converter. In this configuration, the power supply 816 is configured to attach to a 12-volt power source (e.g. a cigarette lighter 814) of a vehicle 102 and to output 5-volts.

User Interface Configuration

FIG. 9 is a schematic diagram of an embodiment of a user interface 206 for a vending machine 100. The user interface 206 comprises a processor 902, a memory 904, a network interface 906, and an input-output (I/O) interface 908. The user interface 206 may be configured as shown or in any other suitable configuration. The processor 902 comprises one or more processors operably coupled to the memory 904. The processor 902 is any electronic circuitry including, but not limited to, state machines, one or more CPU chips, logic units, cores (e.g. a multi-core processor), FPGAs, ASICs, or DSPs. The processor 902 may be a programmable logic device, a microcontroller, a microprocessor, or any suitable combination of the preceding. The processor 902 is communicatively coupled to and in signal communication with the memory 904. The one or more processors are configured to process data and may be implemented in hardware or software. For example, the processor 902 may be 8-bit, 16-bit, 32-bit, 64-bit or of any other suitable architecture. The processor 902 may include an ALU for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement the vending engine 912. In this way, processor 902 may be a special purpose computer designed to implement the functions disclosed herein. In one embodiment, the vending engine 912 is implemented using logic units, FPGAs, ASICs, DSPs, or any other suitable hardware. The vending engine 912 is configured to perform the operations for the user interface 206 described in FIGS. 10-12.

The memory 904 comprises one or more disks, tape drives, or solid-state drives, and may be used as an over-flow data storage device, to store programs when such programs are selected for execution, and to store instructions and data that are read during program execution. The memory 904 may be volatile or non-volatile and may comprise ROM, RAM, TCAM, DRAM, and SRAM.

The memory 904 is operable to store vending instructions 914, an inventory list 916, and/or any other data or instructions. The vending instructions 914 may comprise any suitable set of instructions, logic, rules, or code operable to execute the vending engine 912.

The inventory list 916 is configured to provide information about the products available in the vending machine 100. For example, the inventory list 916 may comprise a plurality of entries that link product information, product identifiers, product weights, and a quantity of a product that is available within the vending machine 100. The inventory list 916 may be implemented as table or in any other suitable data structure.

The network interface 906 is configured to enable wired and/or wireless communications. The network interface 906 is configured to communicate data between the controller 205, the remote server 108, and/or other devices, systems, or domain. For example, the network interface 906 may comprise a WIFI interface, a LAN interface, a WAN interface, a modem, a switch, or a router. The processor 902 is configured to send and receive data using the network interface 906. The network interface 906 may be configured to use any suitable type of communication protocol as would be appreciated by one of ordinary skill in the art.

The I/O interface 908 may comprise ports, transmitters, receivers, transceivers, or any other devices for transmitting and/or receiving data with peripheral devices as would be appreciated by one of ordinary skill in the art upon viewing this disclosure. For example, the I/O interface 908 may be configured to communicate data between the processor 902 and peripheral hardware such as a graphical user interface, a display, a keyboard, a key pad, a touch sensor (e.g. a touch screen), and a global positioning system (GPS) sensor.

In one embodiment, one or more components of the user interface 206 may be common with the components of the controller 205 described in FIG. 8. In other words, the controller 205 and the user interface 206 may share a common processor, memory, network interface, and/or any other components. For example, a common processor may be used to implement both the control engine 808 and the vending engine 912. As another example, a common memory may be used to implement memory 804 and memory 904.

Vending Method

Figure 10:
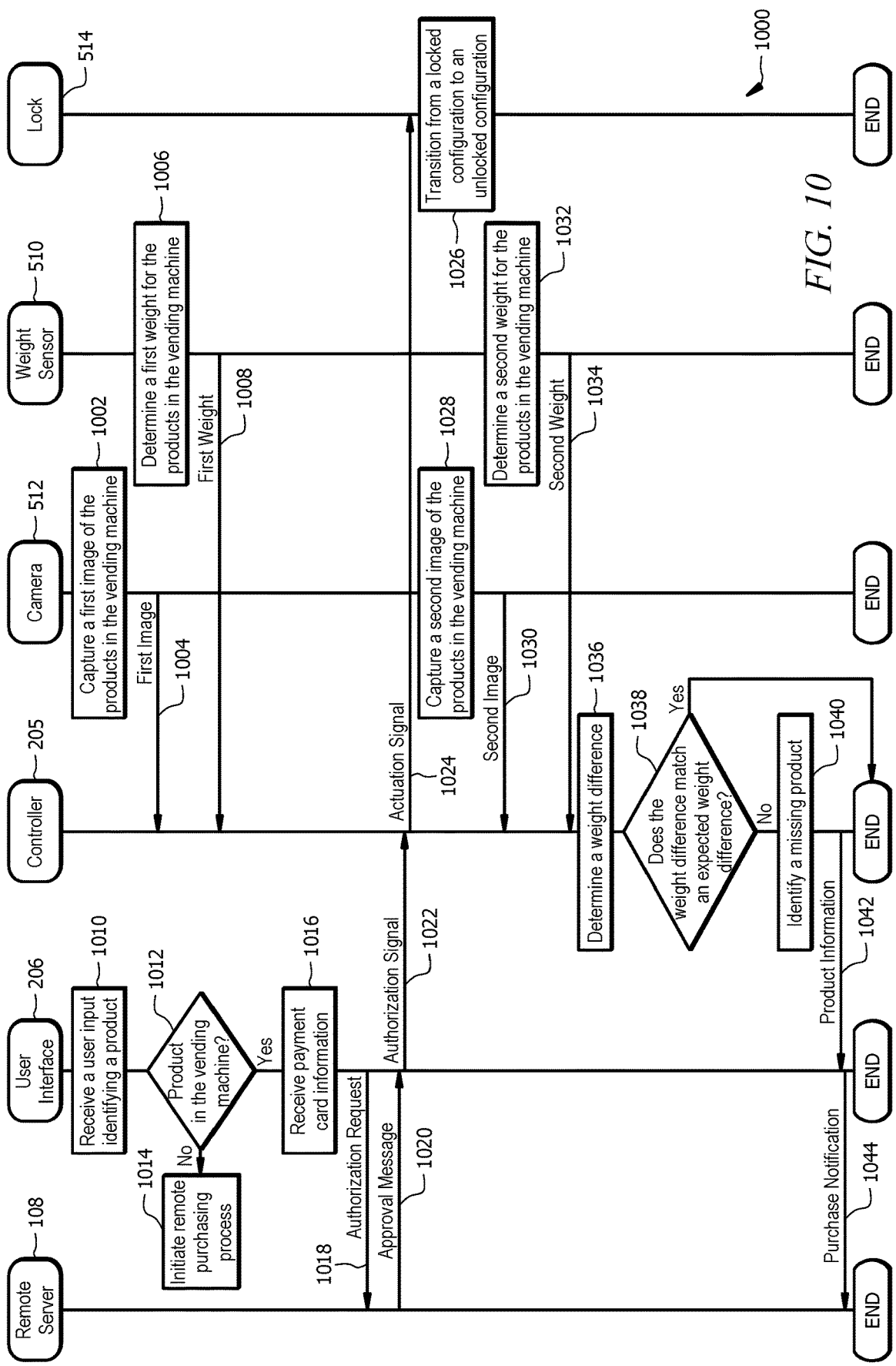
FIG. 10 is a protocol diagram of an embodiment of a vending method for the vending machine.

FIG. 10 is a protocol diagram of an embodiment of a vending method 1000 for the vending machine 100. Method 1000 may be employed by the vending machine 100 in response to a passenger interacting with the vending machine 100. For example, a passenger may be riding in a vehicle 102 where the vending machine 100 is installed and the passenger may interact with the vending machine 100 to purchase one or more products from the vending machine 100.

In one embodiment, the vending machine 100 is configured to monitor the products that are available for purchase in the vending machine 100 by periodically capturing images and/or determining the weight of the products in the interior storage portion 203 of the vending machine 100. At step 1002, the camera 512 captures a first image of products in the vending machine 100. As an example, the controller 205 may send a signal to the camera 512 at predetermined time intervals which triggers the camera 512 to capture an image of the products within the interior storage portion 203 of the vending machine 100. At step 1004, the camera 512 sends the captured first image to the controller 205. The controller 205 compares images that are taken before the vending machine 100 is unlocked with images that are taken after the vending machine 100 is unlocked to determine which products have been removed from the vending machine 100. An example of this process is described below in step 1040.

At step 1006, the weight sensor 510 determines a first weight for the products in the vending machine 100. The weight sensor 510 may generate an electrical signal based on the current weight of the products in the interior storage portion 203 of the vending machine 100. For example, the weight sensor 510 may generate an electrical signal that is proportional to the weight of the objects in the vending machine 100. For example, a 5-volt electrical signal may correspond with a heavy weight and a 0.5-volt electrical signal may correspond with a light weight. At step 1008, the weight sensor 510 sends the first weight to the controller 205. For example, the weight sensor 510 may send the electrical signal (e.g. an analog signal) that corresponds with the weight of the objects in the vending machine 100 to the controller 205. As another example, the weight sensor 510 may send an electrical signal (e.g. a digital signal) that identifies the first weight of the products in the vending machine 100 to the controller 205. The controller 205 may compare the weight that is measured before the vending machine 100 is unlocked with the weight that is measured after the vending machine 100 is unlocked to determine whether the correct number of products have been taken from the vending machine 100. An example of this process is described below in steps 1036-1038.

At step 1010, the user interface 206 receives a user input identifying a product. For example, the user interface 206 may present a list or images of products on a touchscreen graphical user interface of the user interface 206. A passenger may scroll through the list of products and identify one or more products they would like to purchase by selecting the products on the touchscreen of the user interface 206. The user input may further comprise a quantity for the products that the passenger would like to purchase. For example, the passenger may interact with a counter on the user interface 206 to indicate that they would like to purchase three waters.

At step 1012, the user interface 206 determines whether the product is available in the vending machine 100. For example, the user interface 206 may query an inventory list 916 for the vending machine 100 to determine whether the product is still available in the vending machine 100 and/or the quantity of the product that is available in the vending machine 100. The user interface 206 determines that the product is available in the vending machine 100 when the inventory list 916 indicates that the requested quantity of the identified product is available within the vending machine 100. For example, the user interface 206 may determine that the product is available in the vending machine 100 when the quantity of the product in the inventory list 916 is greater than or equal to the requested quantity of the product.

In one embodiment, the user interface 206 may alert the passenger that the requested quantity of the product is unavailable in the vending machine 100. For example, when the passenger requests three waters, the user interface 206 may display an alert that indicates only one water is available in the vending machine 100. The user interface 206 may also allow the passenger to modify (e.g. reduce) their requested quantity of the product to match with what is currently available in the vending machine 100. Continuing with the previous example, the passenger may change their request to one water after being alerted that only one water is available for purchase from the vending machine 100. The user interface 206 determines that the product is unavailable when the inventory list 916 indicates that the identified product is not within the vending machine 100 and/or the requested quantity of the product is not available in the vending machine 100. For example, the user interface 206 may determine that the product is unavailable in the vending machine 100 when the quantity of the product in the inventory list 916 is equal to zero. As another example, the user interface 206 may compare a product identifier (e.g. an item number) for the selected product to the list of products in the inventory list 916 and may determine that the product is unavailable when the product identifier is not present in the inventory list 916. The user interface 206 proceeds to step 1014 in response to determining that the product is not available in the vending machine 100. At step 1014, the user interface 206 exits method 1000 and initiates a remote purchasing process that allows the passenger to purchase the product from a store that is associated with the vending machine 100. An example of the remote purchasing process is described in FIGS. 11 and 12.

Returning to step 1012, the user interface 206 proceeds to step 1016 in response to determining that the product is available in the vending machine 100. At step 1016, the user interface 206 receives payment card information from the passenger. Here, the user interface 206 receives payment card information from the card reader 208. For example, the card reader 208 may obtain payment card information by reading a magnetic strip when the passenger swipes their payment card. As another example, the card reader 208 may obtain payment card information by communicating with a smart chip on a payment card when the passenger inserts their payment card into the card reader 208. As another example, the card reader 208 may obtain payment card information using near field communication when the passenger places their payment card on or near the card reader 208. In other examples, the card reader 208 may obtain payment card information using any other suitable technique as would be appreciated by one of ordinary skill in the art. The card reader 208 sends the collected payment card information to the user interface 206. The payment card information may comprise a card holder name, a card number (e.g. a PAN), a security code, an expiration date, a zip code, or any other information associated with the payment card.

At step 1018, the user interface 206 sends an authorization request to a remote server 108 associated with a payment processor. The authorization request requests a purchase of the product using the payment card information. For example, the authorization request may comprise the payment card information (e.g. a card number) and product information. Examples of product information include, but are not limited to, an item number, a barcode number, an item description, a price, a quantity, or any other suitable type of information.

At step 1020, the remote server 108 sends an approval message to the user interface 206 in response to authorizing the payment. Here, the remote server 108 may process a payment for the identified product using the passenger's payment card information and generate an approval message when the payment has been successfully completed or authorized. The approval message indicates that the passenger has been approved for the requested purchases based on their payment card information.

At step 1022, the user interface 206 sends an authorization signal to the controller 205 in response to receiving the approval message from the remote server 108. The user interface 206 sends the authorization signal to the controller 205 to trigger the controller 205 to unlock the vending machine 100 so that the passenger can retrieve their purchased products.

At step 1024, the controller 205 sends an actuation signal to the lock 514 in response to receiving the authorization signal from the user interface 206. The controller 205 sends the actuation signal to the lock 514 to transition the lock 514 from the locked configuration to the unlocked configuration.

At step 1026, the lock 514 transitions from the locked configuration to the unlocked configuration. Transitioning the lock 514 to the unlocked configuration releases the lid 204 from the closed position and allows the lid 204 to be opened so that the passenger can access the contents of the interior storage portion 203 of the vending machine 100 to retrieve their purchased products.

At step 1028, the camera 512 captures a second image of the products in the vending machine 100 after sending the actuation signal to the lock 514. At step 1030, the camera 512 sends the second image to the controller 205. Here, the camera 512 captures and sends the second image of the products in the vending machine 100 using a process similar to the process described in steps 1002 and 1004.

At step 1032, the weight sensor 510 determines a second weight for the products in the vending machine 100 after sending the actuation signal to the lock 514. At step 1034, the weight sensor 510 sends the second weight to the controller 205. Here, the weight sensor 510 determines and sends the second weight of the products in the vending machine 100 using a process similar to the process described in steps 1006 and 1008.

At step 1036, the controller 205 determines a weight difference between the first weight and the second weight for the products in the vending machine 100. For example, the controller 205 may subtract the second weight from the first weight to determine the weight difference after the passenger has removed products from the vending machine 100.

At step 1038, the controller 205 determines whether the weight difference for the products in the vending machine 100 matches an expected weight difference. Here, the controller 205 checks the weight difference before and after products have been removed from the vending machine 100 to determine whether any additional items were taken from the vending machine 100. The controller 205 may determine an expected weight difference by identifying weights for each of the purchased products and subtracting the product weights from the first weight. For example, the controller 205 may identify weights for the purchased products by looking up their weight information in a product information table 820. The controller 205 may calculate the expected weight difference by combing the weights for the purchased products and subtracting their combined weight from the first weight.

The controller 205 may determine that the weight difference for the products in the vending machine 100 matches an expected weight difference when the weight difference for the products in the vending machine 100 is within a predetermined range from the expected weight difference. For example, the controller 204 may detect a match when the weight difference for the products in the vending machine 100 is within plus or minus two ounces from the expected weight difference. In other examples, the predetermined range may be any other suitable amount of weight.

The controller 205 terminates method 1000 in response to determining that the weight difference for the products in the vending machine 100 matches the expected weight difference. In this case, the controller 205 determines that the passenger has only removed products that they have purchased based on the remaining weight of the products in the vending machine 100.

Returning to step 1038, the controller 205 proceeds to step 1040 in response to determining that the weight difference for the products in the vending machine 100 does not match the expected weight difference. In this case, the controller 205 determines that passenger has removed one or more additional products that they did not purchase based on the remaining weight of the products in the vending machine 100. At step 1040, the controller 205 identifies a missing product. For example, the controller 205 may identify a missing product based on the weight difference between the first weight of the products in the vending machine 100 before the vending machine 100 was unlocked and the second weight of the products in the vending machine 100 after the vending machine 100 is unlocked. In this example, the controller 205 may calculate a product weight based on a difference between the measured weight difference and the expected weight difference and used the calculated product weight to identify the missing product. The controller 205 may compare the calculated product weight to the weight information in the product information table 820 to identify a product with a similar weight that corresponds with the missing product.

As another example, the controller 205 may identify a missing product based on differences between the first image that is taken before the vending machine 100 was unlocked and the second image that is taken after the vending machine 100 is unlocked. In this example, the controller 205 may perform image analysis between a pair of images to determine differences between the two images. For example, the controller 205 may perform object recognition on the first image to identify a first list products that were in the vending machine 100 before the vending machine 100 was unlocked. The controller 205 may also perform object recognition on the second image to identify a second list of products that were in the vending machine 100 after the vending machine 100 was unlocked. The controller 205 may compare the first list of products to the second list of products to identify any difference which corresponds with the products that were removed once the vending machine 100 was unlocked. This process allows the controller 205 to identify any additional products that were removed from the vending machine 100 that were not purchased by the passenger. In other examples, the controller 205 may employ any other suitable image processing technique as would be appreciated by one of ordinary skill in the art.

In one embodiment, the controller 205 may use a combination of information obtained from both a weight sensor 510 and a camera 512 to identify a missing product. The controller 205 may use a weight sensor 510 to first identify a set of potentially missing items based on a determined weight difference and then use the camera 512 to refine the set of potentially missing items in order to determine which items are actually missing. For example, the controller 205 may determine that the weight difference after items were removed from the vending machine 100 is equal to 4 ounces. The controller 205 may then use the weight information in the product information table 820 to identify potentially missing products with a similar weight. In this example, the controller 205 may identify three different items as potentially missing products based on their weight. The controller 205 may then use images from the camera 512 to determine whether any of the identified potentially missing products are actually missing from the vending machine 100. Continuing with the previous example, the controller 205 may perform object recognition using a process similar to the process described above to determine which of the identified potentially missing products are actually missing from the vending machine 100. In other examples, the controller 205 may use any other suitable technique for identifying missing products based on a combination of information from a weight sensor 510 and a camera 512.

At step 1042, the controller 205 sends product information for the missing products to the user interface 206. Here, the controller 205 identifies any missing products so that the user interface 206 can process an additional transaction to purchase the additional products that were taken from the vending machine 100. The product information may comprise an item number, a barcode number, an item description, a price, a quantity, or any other suitable type of information.

At step 1044, the user interface 206 sends the purchase notification to the remote server 108. The purchase notification requests a purchase of the missing products using the payment card information. For example, the purchase notification may comprise the payment card information (e.g. a payment card number) and product information for the missing product. The remote server 108 may process a payment for the identified missing products using the passenger's payment card information and generate another approval message when the payment has been successfully completed.

Remote Vending Method

Figure 11:
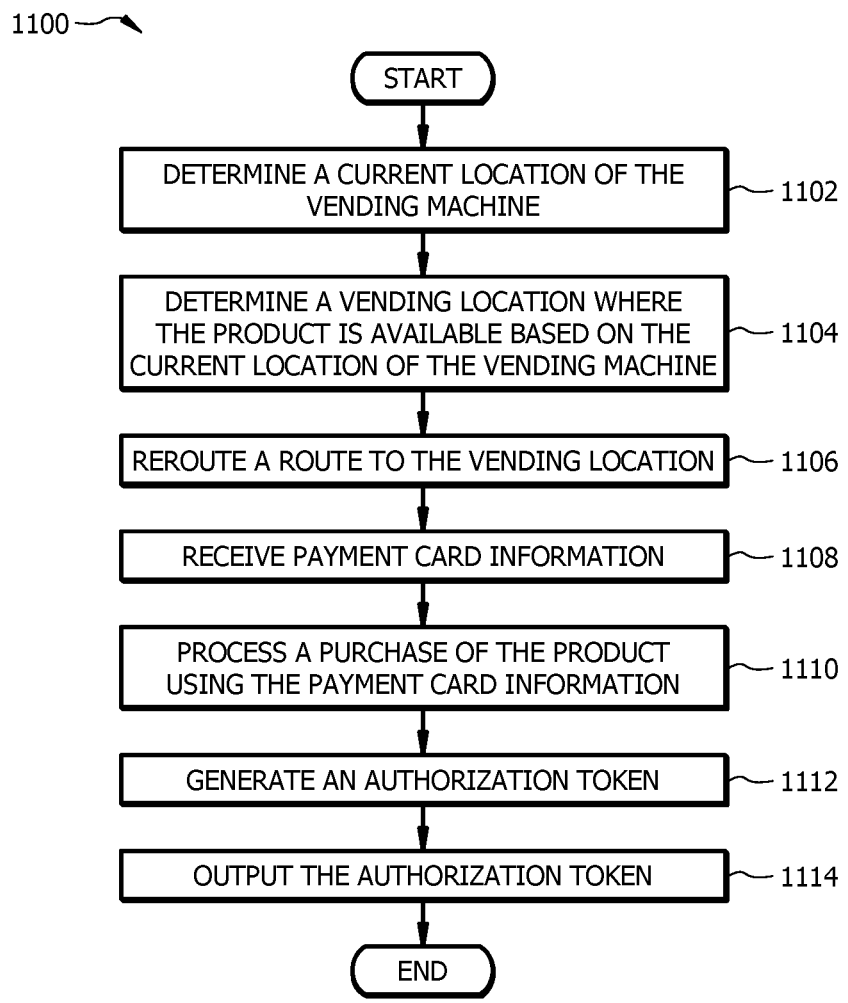
FIG. 11 is a flowchart of an embodiment of a remote vending method for the vending machine.
Figure 12:
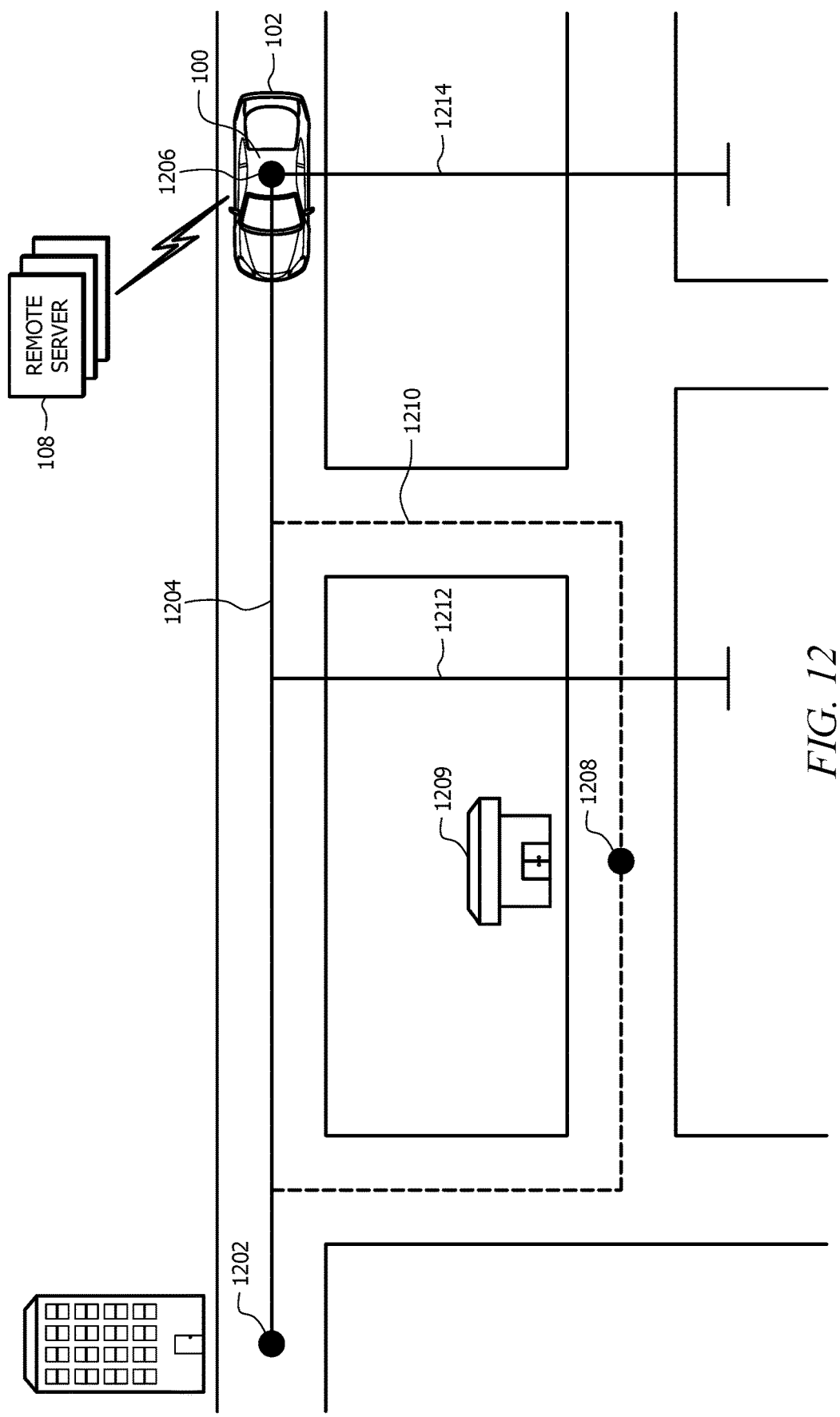
FIG. 12 is an example of the remote vending method for the vending machine.

FIG. 11 is a flowchart of an embodiment of remote vending method 1100 for the vending machine 100. FIG. 12 is a non-limiting example of an implementation of the remote vending method 1100. Referring to FIG. 12, a passenger may be in a vehicle 102 traveling along a predetermined route 1204 toward a final destination 1202. For example, the passenger may be using a ride sharing service, a shuttle service, or taxi service to be transported to the final destination 1202. In one embodiment, the predetermined route 1204 is generated by a ride sharing application based on the location where the passenger is being picked up from and the final destination 1202 where the passenger wants to be dropped off. The final destination 1202 may be a building, a house, an apartment, a store, a venue, a landmark, or any other suitable type of location. The route 1204 may indicate a path between a current location 1206 of the vending machine 100 and the final destination 1202. The route 1204 may also comprise other information such as waypoints that indicate intermediate points along the path between the current location 1206 of the vending machine 100 and the final destination 1202. The ride sharing application may provide information about the route 1204 to the driver and/or the passenger of the vehicle 102. While the passenger is in the vehicle 102, the passenger may initiate method 1100 to purchase a product that is not available within the vending machine 100 in the vehicle 102. For example, method 1100 may be triggered by the user interface 206 of the vending machine 100 in response to determining that a product a passenger is requesting to purchase is not available in the vending machine 100, for example at step 1014 in method 1000. Returning to FIG. 11 at step 1102, the user interface 206 determines a current location 1206 of the vending machine 100. For example, the user interface 206 may use a GPS sensor to determine the current location 1206 of the vending machine 100 and the vehicle 102.

At step 1104, the user interface 206 determines a vending location 1208 where the product is available based on the current location 1206 of the vending machine 100. Referring to FIG. 12 as an example, the user interface 206 may communicate with a remote server 108 associated with a vendor to request a list of stores 1209 where the product is available within a predetermined radius 1214 of the current location 1202 of the vending machine 100. The predetermined radius 1214 may be one mile, five miles, or any other suitable distance. The user interface 206 may select the closest store 1209 and use the location of the store 1209 as the vending location 1208.

As another example, the user interface 206 may communicate with the remote server 108 to request a list of stores 1209 where the product is available within a predetermined radius 1212 along the route 1204 to the final destination 1206. The predetermined radius 1212 may be one mile, five miles, or any other suitable distance. In this example, the user interface 206 may select a store 1209 that may be outside of the predetermined radius 1214 of the vending machine 100 but is within the predetermined radius 1212 of the route 1204. In other words, the user interface 206 may select a store 1209 that is closest to the route 1204 rather than closest to the current location 1206 of the vending machine 100. In this example, the user interface 206 selects a store 1209 that will cause the smallest detour from the original route 1204 and uses the location of the store 1209 as the vending location 1208.

Returning to FIG. 11 at step 1106, the user interface 206 reroutes the existing route 1204 to the vending location 1208. Here, the user interface 206 modifies the route 1204 to the final destination 1202 to include a stop at the vending location 1208 before reaching the final destination 1202. In other words, the user interface 206 creates a detour from the original route 1204 to allow the passenger to pick up any products they purchased using the vending machine 100 before they reach their final destination 1202.

It is contemplated that the vending machine 100 may be used in conjunction with a ridesharing application or platform. In this configuration rerouting information or instructions can be communicated from the vending machine 100 to a remote server 108 associated with ridesharing platform. The remote server 108 may then distribute the rerouting instructions to other devices via the ridesharing application. Referring to FIG. 12 as an example, the user interface 206 may reroute the existing route to include a detour 1210 that stops at the store 1209 at the vending location 1208 before continuing towards the final destination 1202. The user interface 206 may modify the route 1204 by sending a notification to the remote server 108 associated with the ridesharing application. The notification may comprise instructions for modifying the route 1204 in the ridesharing application. For example, the notification may identify the vending location 1208 and/or provide instructions about a new path (e.g. detour 1210) to the vending location 1208. As an example, the remote server 108 associated with the ridesharing application may receive a notification that identifies the vending location 1208 and modify the current route 1204 to include a stop at the vending location 1208. The remote server 108 may then send a map update that includes the detour 1210 and/or instructions for navigating to the vending location 1208 via the ridesharing application. For example, the remote server 108 may send an update that includes navigation instructions for the modified route to the ridesharing application that is operating on a driver's user device (e.g. smart phone).

As another example, the user interface 206 may modify the route 1204 by sending a notification to the driver of the vehicle 102. In this example, the user interface 206 provide instructions to the driver about the modifications to the route 1204. The user interface 206 may provide instructions using audible instructions, text instruction, graphical instructions, or any other suitable type of instructions. In other examples, the user interface 206 may modify the route 1204 using any other suitable technique as would be appreciated by one of ordinary skill in the art.

Returning to FIG. 11 at step 1108, the user interface 206 receives payment card information from the passenger. Here, the passenger may interact with the card reader 208 to provide their payment card information to the user interface 206. For example, the card reader 208 may obtain payment card information by reading a magnetic strip when the passenger swipes their payment card. As another example, the card reader 208 may obtain payment card information by communicating with a smart chip on a payment card when the passenger inserts their payment card into the card reader 208. As another example, the card reader 208 may obtain payment card information using near field communication when the passenger places their payment card on or near the card reader 208. In other examples, the card reader 208 may obtain payment card information using any other suitable technique as would be appreciated by one of ordinary skill in the art. The card reader 208 sends the collected payment card information to the user interface 206. The payment card information may comprise a card holder name, a card number (e.g. a PAN), a security code, an expiration date, a zip code, or any other information associated with the payment card.

At step 1110, the user interface 206 processes a purchase of the product using the payment card information. In one embodiment, the user interface 206 may send an authorization request to a remote server 108 associated with a payment processor. The authorization request requests a purchase of the product using the payment card information. The authorization request may comprise the payment card information (e.g. a payment card number) and product information. The product information may comprise an item number, a barcode number, an item description, a price, a quantity, or any other suitable type of information. The remote server 108 sends an approval message to the user interface 206 in response to authorizing the payment. Here, the remote server 108 may process a payment for the identified product using the passenger's payment card information and generate an approval message when the payment has been successfully completed or authorized. The approval message indicates that the passenger has been approved for the requested purchases based on their payment card information.

At step 1112, the user interface 206 generates an authorization token in response to an approval for purchasing the requested products. The authorization token may be any suitable identifier that can be presented or used to retrieve the purchased product. As an example, the user interface 206 generates an alphanumeric code that represents the authorization token. As another example, the user interface 206 generates a barcode that represents the authorization token. Examples of barcodes include, but are not limited to, Universal Product Codes (UPCs) and two-dimensional barcodes (e.g. quick response (QR) codes).

At step 1114, the user interface 206 outputs the authorization token. For example, the user interface 206 may output the authorization token by printing a representation of the authorization token onto a ticket. For instance, the user interface 206 may print an alphanumeric code or barcode that represents the authorization token onto a ticket. In this example, the passenger can use the ticket to retrieve the purchased product from the store 1209 at the vending location 1208. As another example, the user interface 206 may output the authorization token by displaying the authorization token to the customer on a display of the user interface 206.

As another example, the user interface 206 may output the authorization token by sending the authorization token to a device located at the vending location. For instance, the user interface 206 may send the authorization token to a point-of-sale (POS) device (e.g. a register) in the store 1209 at the vending location 1208 via the remote server 108 associated with the vendor. In this example, the passenger is able to go into the store 1209 to retrieve their product without having to perform a transaction for the product within the store 1209. As another example, the user interface 206 may send the authorization token to the passenger's user device, such as a smart phone. In this example, the passenger can present the authorization token from user device to retrieve the purchased product from the store 1209. The user interface 206 may send the authorization token to the passenger's user device using an application pop-up or notification, short message service (SMS), nearfield communication (NFC), WiFi, Bluetooth communication, or any other suitable type of wired or wireless communication technique. In other examples, the user interface 206 may output the authorization token to the passenger using any other suitable technique as would be appreciated by one of ordinary skill in the art.

Once the passenger obtains the authorization token, the passenger will be detoured to the store 1209 at the vending location 1208 so they can retrieve their purchased products. For example, the passenger may go into the store 1209 and retrieve their products by presenting the authorization token to a store attendant or POS device in the store 1209. The passenger is then able to resume their journey to the final destination 1206 with minimal delay.

In one embodiment, method 1100 may be implemented by an application on a mobile device. In this embodiment, method 1100 may be executed regardless of whether a vending machine 100 in located in the vehicle 102 that the passenger is riding in. For example, the passenger may use a mobile application that is associated with a vendor on their user device to execute method 1100. In this example, the passenger's user device performs steps 1102-1114 as described above. This implementation allows the passenger to use their user device and mobile application to modify their existing ridesharing route to a final destination to include a stop where the passenger can retrieve products they purchased remotely via the mobile application before reaching their final destination.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A vending machine, comprising:
  a housing configured to couple to an interior of a vehicle, comprising an interior storage portion;
  a lid coupled to the housing, wherein:
    the lid is configurable between a closed position and an open position;
    the lid is configured to restrict access to the interior storage portion of the housing when the lid is in the closed position; and
    the lid is configured to allow access to the interior storage portion of the housing when the lid is in the open position;
  an electromechanical lock coupled to the housing, wherein:
    the electromechanical lock is configured to transition from a locked configuration to an unlocked configuration in response to an actuation signal;
    the electromechanical lock is configured to maintain the lid in the closed position when the electromechanical lock is in the locked configuration; and
    the electromechanical lock is configured to release the lid from the closed position when the electromechanical lock is in the unlocked configuration;
  a card reader coupled to the housing, configured to receive payment card information for a payment card;
  a user interface coupled to the housing and in signal communication with the card reader, configured to:
    display one or more products that are available for purchase, wherein the one or more products comprise a product that is not located within the interior storage portion of the housing;
    receive a user input from a user inside of the vehicle, wherein the user input identifies the product that is not located within the interior storage portion of the housing;
    receive payment card information from the card reader;
    send an authorization request to a remote server, wherein the authorization request requests a purchase of the product using the payment card information;
    receive an approval message that authorizes the purchase of the product in response to sending the authorization request;
    determine a current location of the housing;
    determine a location where the product is available based on the current location of the housing; and
    output a notification that identifies the determined location, wherein the notification comprises instructions to stop at the determined location where the product is available before the user reaches a final destination in the vehicle; and
  a controller coupled to the housing and in signal communication with the user interface, configured to send the actuation signal to the electromechanical lock in response to a signal from the user interface.

2. The device of claim 1, further comprising a weight sensor disposed within the housing and in signal communication with the controller, wherein the weight sensor measures a weight of one or more objects located in the interior storage portion of the housing.

3. The device of claim 1, wherein a camera disposed within the housing and in signal communication with the controller, wherein the camera captures images of objects located in the interior storage portion of the housing.

4. The device of claim 1, wherein the interior storage portion of the housing is removable from the housing.

5. The device of claim 1, wherein the housing is removably coupled to the interior of the vehicle using a strap.

6. The device of claim 1, wherein at least a portion of the lid is transparent.

7. The device of claim 1, wherein the user interface comprises a touchscreen device configured to display the one or more products that are available for purchase.

8. The device of claim 1, wherein the user interface is further configured to:
  compare a product identifier for the product to an inventory list of items that are available in the interior storage portion; and
  determine that the product is not located within the interior storage portion based on the comparison.

9. A vending method, comprising:
  displaying, by a user interface of a device mounted to a vehicle, one or more products available for purchase;
  receiving, by the user interface, a user input identifying a product from among the one or more products available for purchase;
  receiving, by the user interface, payment card information for a payment card from a card reader installed on the device;
  sending, by the user interface, an authorization request to a remote server, wherein the authorization request requests a purchase of the product using the payment card information;
  receiving, by the user interface, an approval message that authorizes the purchase of the product in response to sending the authorization request;
  sending, by the user interface, an authorization signal to a controller installed on the device in response to receiving the approval message;
  sending, by the controller, an actuation signal to an electromechanical lock installed on the device in response to receiving the authorization signal; and
  transitioning, by the electromechanical lock, from a locked configuration to an unlocked configuration, wherein:
    the electromechanical lock maintains a lid of the device in a closed position when the electromechanical lock is in the locked configuration;
    the lid restricts access to an interior storage portion of the device when the lid is in the closed position; and
    the electromechanical lock releases the lid of the device from the closed position when the electromechanical lock is in the unlocked configuration.

10. The method of claim 9, further comprising:
sending, by a weight sensor installed on the device, a first weight for products in the interior storage portion of the device to the controller before the controller sends the actuation signal to the electromechanical lock;
sending, by the weight sensor, a second weight for the products in the interior storage portion of the device to the controller after the controller sends the actuation signal to the electromechanical lock;
determining, by the controller, a weight difference based on the first weight and the second weight;
comparing, by the controller, the weight difference to an expected weight difference;
determining, by the controller, the weight difference is greater than the expected weight difference;
determining, by the controller, a product is missing in response to determining that the weight difference is greater than the expected weight difference;
identifying, by the controller, a missing product based on the weight difference; and
sending, by the controller, a notification to the remote server of the missing product.

11. The method of claim 9, further comprising:
sending, by a camera installed on the device, a first image of products within the interior storage portion of the device to the controller before the controller sends the actuation signal to the electromechanical lock;
sending, by the camera, a second image of the products within the interior storage portion of the device to the controller after the controller sends the actuation signal to the electromechanical lock;
comparing, by the controller, the first image to the second image;
determining, by the controller, a product is missing based on the comparison of the first image and the second image;
identifying, by the controller, a missing product based on the comparison of the first image and the second image; and
sending, by the controller, a notification to the remote server of the missing product.

12. The method of claim 9, further comprising:
sending, by a weight sensor installed on the device, a first weight for products in the interior storage portion of the device to the controller before the controller sends the actuation signal to the electromechanical lock;
sending, by a camera installed on the device, a first image of products within the interior storage portion of the device before the controller sends the actuation signal to the electromechanical lock;
sending, by the weight sensor, a second weight for the products in the interior storage portion of the device to the controller after the controller sends the actuation signal to the electromechanical lock;
sending, by the camera, a second image of the products within the interior storage portion of the device to the controller after the controller sends the actuation signal to the electromechanical lock;
determining, by the controller, a weight difference based on the first weight and the second weight;
comparing, by the controller, the weight difference to an expected weight difference;
determining, by the controller, the weight difference is greater than the expected weight difference;
determining, by the controller, a product is missing in response to determining that the weight difference is greater than the expected weight difference;
comparing, by the controller, the first image to the second image;
identifying, by the controller, a missing product based on the comparison of the first image and the second image; and
sending, by the controller, a notification to the remote server of the missing product.

13. The method of claim 9, further comprising:
comparing, by the user interface, a product identifier for the product to an inventory list of items that are available in the device; and
determining, by the user interface, that the product is available within the device based on the comparison.

14. The method of claim 9, further comprising:
displaying, by the user interface, one or more products available at a vending location associated with the device.

15. A computer program comprising executable instructions stored in a non-transitory computer readable medium that when executed by a processor causes the processor to:
display one or more products that are available for purchase in a device;
receive a user input identifying a product from among the one or more products that are available for purchase;
receive payment card information from a card reader;
send an authorization request to a remote server, wherein the authorization request requests a purchase of the product using the payment card information;
receive an approval message that authorizes the purchase of the product in response to sending the authorization request; and
send an actuation signal to transition an electromechanical lock from a locked configuration to an unlocked configuration, wherein:
the electromechanical lock maintains a lid of the device in a closed position when the electromechanical lock is in the locked configuration;
the lid restricts access to an interior storage portion of the device when the lid is in the closed position; and
the electromechanical lock releases the lid of the device from the closed position when the electromechanical lock is in the unlocked configuration.

16. The computer program of claim 15, further comprising instructions that when executed by the processor cause the processor to:
compare a product identifier for the product to an inventory list of items that are available in the device; and
determine that the product is available within the device based on the comparison.

17. The computer program of claim 15, further comprising instructions that when executed by the processor cause the processor to:
receive a first weight for products in the device before sending the actuation signal to the electromechanical lock;
receive a second weight for the products in the device after sending the actuation signal to the electromechanical lock;
determine a weight difference based on the first weight and the second weight;
compare the weight difference to an expected weight difference;
determine the weight difference is greater than the expected weight difference;
determine a product is missing in response to determining that the weight difference is greater than the expected weight difference;

identify a missing product based on the weight difference; and send a notification to the remote server of the missing product.

18. The computer program of claim 15, further comprising instructions that when executed by the processor cause the processor to:

receive a first image of products within the device before sending the actuation signal to the electromechanical lock;

receive a second image of the products within the device after sending the actuation signal to the electromechanical lock;

compare the first image to the second image;

determine a product is missing based on the comparison of the first image and the second image;

identify a missing product based on the comparison of the first image and the second image; and send a notification to the remote server of the missing product.

19. The computer program of claim 15, further comprising instructions that when executed by the processor cause the processor to:

receive a first weight for products in the device before sending the actuation signal to the electromechanical lock;

receive a first image of products within the device before sending the actuation signal to the electromechanical lock;

receive a second weight for the products in the device after sending the actuation signal to the electromechanical lock;

receive a second image of the products within the device after sending the actuation signal to the electromechanical lock;

determine a weight difference based on the first weight and the second weight;

compare the weight difference to an expected weight difference;

determine the weight difference is greater than the expected weight difference;

determine a product is missing in response to determining that the weight difference is greater than the expected weight difference;

compare the first image to the second image;

identify a missing product based on the comparison of the first image and the second image; and send a notification to the remote server of the missing product.

* * * * *